United States Patent
Sezan et al.

(10) Patent No.: US 7,594,245 B2
(45) Date of Patent: Sep. 22, 2009

(54) NETWORKED VIDEO DEVICES

(75) Inventors: M. Ibrahim Sezan, Camas, WA (US); James H. Errico, Arlington Heights, IL (US); George R. Borden, Portland, OR (US); Gary A. Feather, Camas, WA (US); Mick G. Grover, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 640 days.

(21) Appl. No.: 11/152,800

(22) Filed: Jun. 13, 2005

(65) Prior Publication Data

US 2006/0174277 A1 Aug. 3, 2006

Related U.S. Application Data

(63) Continuation-in-part of application No. 10/906,754, filed on Mar. 4, 2005.

(60) Provisional application No. 60/629,726, filed on Nov. 19, 2004, provisional application No. 60/550,301, filed on Mar. 4, 2004.

(51) Int. Cl.
*H04N 7/16* (2006.01)
*H04N 5/445* (2006.01)
*H04N 7/173* (2006.01)
*G06F 3/00* (2006.01)
*G06F 13/00* (2006.01)

(52) U.S. Cl. .............................. 725/46; 725/13; 725/45; 725/91

(58) Field of Classification Search ............. 725/13, 725/45, 91, 46
See application file for complete search history.

(56) References Cited

U.S. PATENT DOCUMENTS

| 4,183,056 A | 1/1980 | Evans et al. |
| 4,253,108 A | 2/1981 | Engel |
| 4,298,884 A | 11/1981 | Reneau |
| 4,321,635 A | 3/1982 | Tsuyuguchi |
| 4,324,402 A | 4/1982 | Klose |
| 4,520,404 A | 5/1985 | Von Kohorn |
| 4,729,044 A | 3/1988 | Kiesel |
| 4,937,685 A | 6/1990 | Barker et al. |
| 5,012,334 A | 4/1991 | Etra |
| 5,027,400 A | 6/1991 | Baji et al. |
| 5,101,364 A | 3/1992 | Davenport et al. |
| 5,109,482 A | 4/1992 | Bohrman |
| 5,148,154 A | 9/1992 | MacKay et al. |
| 5,200,825 A | 4/1993 | Perine |

(Continued)

FOREIGN PATENT DOCUMENTS

EP    1250807    10/2002

(Continued)

OTHER PUBLICATIONS

"User Preference Description for MPEG-7," ISO/IEC JTC1/SC29/WG11, MPEG 99/MXXXX, Maui, Hawaii, Dec. 1999, pp. 1-18.

(Continued)

*Primary Examiner*—Hunter B. Lonsberry
(74) *Attorney, Agent, or Firm*—Chernoff, Vilhauer, McClung & Stenzel

(57) ABSTRACT

A collaborative information system.

4 Claims, 14 Drawing Sheets

U.S. PATENT DOCUMENTS

| | | |
|---|---|---|
| 5,222,924 A | 6/1993 | Shin et al. |
| 5,241,671 A | 8/1993 | Reed et al. |
| 5,288,069 A | 2/1994 | Matsumoto |
| D348,251 S | 6/1994 | Hendricks |
| 5,333,091 A | 7/1994 | Iggulden et al. |
| 5,339,393 A | 8/1994 | Duffy et al. |
| D354,059 S | 1/1995 | Hendricks |
| 5,381,477 A | 1/1995 | Beyers, II et al. |
| 5,404,316 A | 4/1995 | Klingler et al. |
| 5,410,344 A | 4/1995 | Graves et al. |
| 5,424,770 A | 6/1995 | Schmelzer et al. |
| 5,434,678 A | 7/1995 | Abecassis |
| 5,444,499 A | 8/1995 | Saitoh |
| 5,452,016 A | 9/1995 | Ohara et al. |
| 5,459,830 A | 10/1995 | Ohba et al. |
| 5,483,278 A | 1/1996 | Strubbe et al. |
| D368,263 S | 3/1996 | Hendricks |
| 5,521,841 A | 5/1996 | Arman et al. |
| 5,550,965 A | 8/1996 | Gabbe et al. |
| 5,559,549 A | 9/1996 | Hendricks et al. |
| 5,589,945 A | 12/1996 | Abecassis |
| 5,600,364 A | 2/1997 | Hendricks et al. |
| 5,600,573 A | 2/1997 | Hendricks et al. |
| 5,600,781 A | 2/1997 | Root et al. |
| 5,610,653 A | 3/1997 | Abecassis |
| 5,634,849 A | 6/1997 | Abecassis |
| 5,635,982 A | 6/1997 | Zhang et al. |
| D381,991 S | 8/1997 | Hendricks |
| 5,654,769 A | 8/1997 | Ohara et al. |
| 5,659,350 A | 8/1997 | Hendricks et al. |
| 5,664,046 A | 9/1997 | Abecassis |
| 5,664,227 A | 9/1997 | Mauldin et al. |
| 5,675,752 A | 10/1997 | Scott et al. |
| 5,682,195 A | 10/1997 | Hendricks et al. |
| 5,684,918 A | 11/1997 | Abecassis |
| 5,694,163 A | 12/1997 | Harrison |
| 5,696,869 A | 12/1997 | Abecassis |
| 5,696,965 A | 12/1997 | Dedrick |
| 5,710,884 A | 1/1998 | Dedrick |
| 5,717,814 A | 2/1998 | Abecassis |
| 5,717,879 A | 2/1998 | Moran et al. |
| 5,724,472 A | 3/1998 | Abecassis |
| 5,727,129 A | 3/1998 | Barrett et al. |
| 5,734,853 A | 3/1998 | Hendricks et al. |
| 5,758,257 A | 5/1998 | Herz et al. |
| 5,758,259 A | 5/1998 | Lawler |
| 5,761,881 A | 6/1998 | Wall |
| 5,764,916 A | 6/1998 | Busey et al. |
| 5,774,357 A | 6/1998 | Hoffberg et al. |
| 5,778,108 A | 7/1998 | Coleman, Jr. |
| 5,781,188 A | 7/1998 | Amiot et al. |
| 5,790,935 A * | 8/1998 | Payton ........................ 725/91 |
| 5,794,210 A | 8/1998 | Goldhaber et al. |
| 5,797,001 A | 8/1998 | Augenbraun et al. |
| 5,798,785 A | 8/1998 | Hendricks et al. |
| 5,805,733 A | 9/1998 | Wang et al. |
| 5,809,426 A | 9/1998 | Radojevic et al. |
| 5,821,945 A | 10/1998 | Yeo et al. |
| 5,822,537 A | 10/1998 | Katseff et al. |
| 5,828,809 A | 10/1998 | Chang et al. |
| 5,828,839 A | 10/1998 | Moncreiff |
| 5,835,087 A | 11/1998 | Herz et al. |
| D402,310 S | 12/1998 | Hendricks |
| 5,848,396 A | 12/1998 | Gerace |
| 5,861,881 A | 1/1999 | Freeman et al. |
| 5,867,226 A | 2/1999 | Wehmeyer et al. |
| 5,867,386 A | 2/1999 | Hoffberg et al. |
| 5,875,107 A | 2/1999 | Nagai et al. |
| 5,875,108 A | 2/1999 | Hoffberg et al. |
| 5,877,821 A | 3/1999 | Newlin et al. |
| 5,878,222 A | 3/1999 | Harrison |
| 5,892,536 A | 4/1999 | Logan et al. |
| 5,900,867 A | 5/1999 | Schindler et al. |
| 5,901,246 A | 5/1999 | Hoffberg et al. |
| 5,903,454 A | 5/1999 | Hoffberg et al. |
| 5,907,324 A | 5/1999 | Larson et al. |
| 5,913,013 A | 6/1999 | Abecassis |
| 5,913,030 A | 6/1999 | Lotspiech et al. |
| 5,920,300 A | 7/1999 | Yamazaki et al. |
| 5,920,360 A | 7/1999 | Coleman, Jr. |
| 5,920,477 A | 7/1999 | Hoffberg et al. |
| 5,923,365 A | 7/1999 | Tamir et al. |
| 5,926,624 A | 7/1999 | Katz et al. |
| 5,930,783 A | 7/1999 | Li et al. |
| 5,933,811 A | 8/1999 | Angles et al. |
| 5,945,988 A | 8/1999 | Williams et al. |
| 5,956,026 A | 9/1999 | Ratakonda |
| 5,958,006 A | 9/1999 | Eggleston et al. |
| 5,959,681 A | 9/1999 | Cho |
| 5,959,697 A | 9/1999 | Coleman, Jr. |
| 5,969,755 A | 10/1999 | Courtney |
| 5,973,683 A | 10/1999 | Cragun et al. |
| 5,977,964 A | 11/1999 | Williams et al. |
| 5,986,690 A | 11/1999 | Hendricks |
| 5,986,692 A | 11/1999 | Logan et al. |
| 5,987,211 A | 11/1999 | Abecassis |
| 5,990,927 A | 11/1999 | Hendricks et al. |
| 5,990,980 A | 11/1999 | Golin |
| 5,995,094 A | 11/1999 | Eggen et al. |
| 5,995,095 A | 11/1999 | Ratakonda |
| 6,002,833 A | 12/1999 | Abecassis |
| 6,005,565 A | 12/1999 | Legall et al. |
| 6,005,597 A | 12/1999 | Barrett et al. |
| 6,006,265 A | 12/1999 | Rangan et al. |
| 6,011,895 A | 1/2000 | Abecassis |
| 6,014,183 A | 1/2000 | Hoang |
| 6,020,883 A | 2/2000 | Herz et al. |
| 6,029,195 A | 2/2000 | Herz |
| 6,038,367 A | 3/2000 | Abecassis |
| 6,041,323 A | 3/2000 | Kubota |
| 6,049,821 A | 4/2000 | Theriault et al. |
| 6,052,554 A | 4/2000 | Hendricks et al. |
| 6,055,018 A | 4/2000 | Swan |
| 6,060,167 A | 5/2000 | Morgan et al. |
| 6,064,385 A | 5/2000 | Sturgeon et al. |
| 6,067,401 A | 5/2000 | Abecassis |
| 6,070,167 A | 5/2000 | Qian et al. |
| 6,072,934 A | 6/2000 | Abecassis |
| 6,076,166 A | 6/2000 | Moshfeghi et al. |
| 6,078,917 A | 6/2000 | Paulsen, Jr. et al. |
| 6,078,928 A | 6/2000 | Schnase et al. |
| 6,081,278 A | 6/2000 | Chen |
| 6,081,750 A | 6/2000 | Hoffberg et al. |
| 6,088,455 A | 7/2000 | Logan et al. |
| 6,088,722 A | 7/2000 | Herz et al. |
| 6,091,886 A | 7/2000 | Abecassis |
| RE36,801 E | 8/2000 | Logan et al. |
| 6,100,941 A | 8/2000 | Dimitrova et al. |
| 6,115,709 A | 9/2000 | Gilmour et al. |
| 6,122,657 A | 9/2000 | Hoffman, Jr. et al. |
| 6,128,624 A | 10/2000 | Papierniak et al. |
| 6,133,909 A | 10/2000 | Schein et al. |
| 6,137,486 A | 10/2000 | Yoshida et al. |
| 6,141,041 A | 10/2000 | Carlbom et al. |
| 6,141,060 A | 10/2000 | Honey et al. |
| 6,144,375 A | 11/2000 | Jain et al. |
| 6,151,444 A | 11/2000 | Abecassis |
| D435,561 S | 12/2000 | Pettigrew et al. |
| 6,160,989 A | 12/2000 | Hendricks et al. |
| 6,161,142 A | 12/2000 | Wolfe et al. |
| 6,169,542 B1 | 1/2001 | Hooks et al. |
| 6,177,931 B1 | 1/2001 | Alexander et al. |
| 6,181,335 B1 | 1/2001 | Hendricks et al. |
| 6,185,625 B1 | 2/2001 | Tso et al. |

| Patent No. | Date | Inventor(s) |
|---|---|---|
| 6,195,497 B1 | 2/2001 | Nagasaka et al. |
| 6,198,767 B1 | 3/2001 | Greenfield et al. |
| 6,199,076 B1 | 3/2001 | Logan et al. |
| 6,201,536 B1 | 3/2001 | Hendricks et al. |
| 6,208,805 B1 | 3/2001 | Abecassis |
| 6,212,527 B1 | 4/2001 | Gustman |
| 6,215,526 B1 | 4/2001 | Barton et al. |
| 6,216,129 B1 | 4/2001 | Eldering |
| 6,219,837 B1 | 4/2001 | Yeo et al. |
| 6,226,678 B1 | 5/2001 | Mattaway et al. |
| 6,230,172 B1 | 5/2001 | Purnaveja et al. |
| 6,230,501 B1 | 5/2001 | Bailey, Sr. et al. |
| 6,233,289 B1 | 5/2001 | Fredrickson |
| 6,233,389 B1 | 5/2001 | Barton et al. |
| 6,233,586 B1 | 5/2001 | Chang et al. |
| 6,236,395 B1 | 5/2001 | Sezan et al. |
| 6,240,406 B1 | 5/2001 | Tannen |
| 6,252,444 B1 | 6/2001 | Hoffberg |
| 6,252,544 B1 | 6/2001 | Hoffberg |
| 6,253,203 B1 | 6/2001 | O'Flaherty et al. |
| 6,269,216 B1 | 7/2001 | Abecassis |
| 6,275,268 B1 | 8/2001 | Ellis et al. |
| 6,286,140 B1 | 9/2001 | Ivanyi |
| 6,286,141 B1 | 9/2001 | Browne et al. |
| 6,289,165 B1 | 9/2001 | Abecassis |
| 6,298,482 B1 | 10/2001 | Seidman et al. |
| 6,304,665 B1 | 10/2001 | Cavallaro et al. |
| 6,304,715 B1 | 10/2001 | Abecassis |
| 6,311,189 B1 | 10/2001 | DeVries et al. |
| 6,317,718 B1 | 11/2001 | Fano |
| 6,317,881 B1 | 11/2001 | Shah-Nazaroff et al. |
| 6,320,624 B1 | 11/2001 | Ayer et al. |
| 6,339,842 B1 | 1/2002 | Fernandez et al. |
| 6,342,904 B1 | 1/2002 | Vasudevan et al. |
| 6,363,160 B1 | 3/2002 | Bradski et al. |
| 6,370,504 B1 | 4/2002 | Zick et al. |
| 6,405,371 B1 | 6/2002 | Oosterhout et al. |
| 6,412,008 B1 | 6/2002 | Fields et al. |
| 6,418,168 B1 | 7/2002 | Narita |
| 6,421,680 B1 | 7/2002 | Kumhyr et al. |
| 6,425,133 B1 | 7/2002 | Leary |
| 6,426,761 B1 | 7/2002 | Kanevsky et al. |
| 6,426,974 B2 | 7/2002 | Takahashi et al. |
| 6,438,579 B1 | 8/2002 | Hosken |
| 6,439,572 B1 | 8/2002 | Bowen |
| 6,446,261 B1 | 9/2002 | Rosser |
| 6,480,667 B1 | 11/2002 | O'Connor |
| 6,487,390 B1 | 11/2002 | Virine et al. |
| 6,498,783 B1 | 12/2002 | Lin |
| 6,522,342 B1 | 2/2003 | Gagnon et al. |
| 6,530,082 B1 | 3/2003 | Del Sesto et al. |
| 6,535,639 B1 | 3/2003 | Uchihachi et al. |
| 6,543,053 B1 | 4/2003 | Li et al. |
| 6,546,555 B1 | 4/2003 | Hjelsvold et al. |
| 6,549,643 B1 | 4/2003 | Toklu et al. |
| 6,553,178 B2 | 4/2003 | Abecassis |
| 6,556,767 B2 | 4/2003 | Okayama et al. |
| 6,571,279 B1 | 5/2003 | Herz et al. |
| 6,578,075 B1 | 6/2003 | Nieminen et al. |
| 6,581,207 B1 | 6/2003 | Sumita et al. |
| 6,587,127 B1 | 7/2003 | Leeke et al. |
| 6,593,936 B1 | 7/2003 | Huang et al. |
| 6,594,699 B1 | 7/2003 | Sahai et al. |
| 6,597,859 B1 | 7/2003 | Leinhart et al. |
| 6,611,876 B1 | 8/2003 | Barrett et al. |
| 6,614,987 B1 | 9/2003 | Ismail et al. |
| 6,658,095 B1 | 12/2003 | Yoakum et al. |
| 6,665,423 B1 | 12/2003 | Mehrotra et al. |
| 6,678,635 B2 | 1/2004 | Tovinkere et al. |
| 6,678,659 B1 | 1/2004 | Van Kommer |
| 6,681,395 B1 | 1/2004 | Nishi |
| 6,691,126 B1 | 2/2004 | Syeda-Mahmood |
| 6,697,523 B1 | 2/2004 | Divakaran et al. |
| 6,704,929 B1 | 3/2004 | Ozer et al. |
| 6,724,933 B1 | 4/2004 | Lin et al. |
| 6,754,904 B1 | 6/2004 | Cooper et al. |
| 6,754,906 B1 | 6/2004 | Finseth et al. |
| 6,766,362 B1 | 7/2004 | Miyasaka et al. |
| 6,774,917 B1 | 8/2004 | Foote et al. |
| 6,820,278 B1 | 11/2004 | Ellis |
| 6,829,781 B1 | 12/2004 | Bhagavath et al. |
| 6,868,440 B1 | 3/2005 | Gupta et al. |
| 6,880,171 B1 | 4/2005 | Ahmad et al. |
| 6,925,455 B2 | 8/2005 | Gong et al. |
| 6,931,595 B2 | 8/2005 | Pan et al. |
| 6,961,954 B1 | 11/2005 | Maybury et al. |
| 6,970,510 B1 | 11/2005 | Wee et al. |
| 6,981,129 B1 | 12/2005 | Boggs et al. |
| 6,990,679 B2 | 1/2006 | Curreri |
| 6,993,245 B1 | 1/2006 | Harville |
| 7,026,964 B2 | 4/2006 | Baldwin et al. |
| 7,065,709 B2 | 6/2006 | Ellis et al. |
| 7,296,285 B1 | 11/2007 | Jun et al. |
| 7,343,381 B2 | 3/2008 | Shin |
| 7,454,775 B1 | 11/2008 | Schaffer et al. |
| 2001/0030664 A1 | 10/2001 | Shulman et al. |
| 2002/0013943 A1 | 1/2002 | Haberman et al. |
| 2002/0018594 A1 | 2/2002 | Xu et al. |
| 2002/0026345 A1 | 2/2002 | Juels |
| 2002/0079165 A1 | 6/2002 | Wolfe |
| 2002/0080162 A1 | 6/2002 | Pan et al. |
| 2002/0083473 A1 | 6/2002 | Agnihotri et al. |
| 2002/0097165 A1 | 7/2002 | Hulme |
| 2002/0120929 A1 | 8/2002 | Schwalb et al. |
| 2002/0133412 A1 | 9/2002 | Oliver et al. |
| 2002/0141619 A1 | 10/2002 | Standridge et al. |
| 2002/0156909 A1 | 10/2002 | Harrington |
| 2002/0178135 A1 | 11/2002 | Tanaka |
| 2002/0184220 A1 | 12/2002 | Teraguchi et al. |
| 2002/0190991 A1 | 12/2002 | Efran et al. |
| 2002/0194589 A1 | 12/2002 | Cristofalo et al. |
| 2003/0001880 A1 | 1/2003 | Holtz et al. |
| 2003/0007555 A1 | 1/2003 | Divakaran et al. |
| 2003/0026592 A1 | 2/2003 | Kawahara et al. |
| 2003/0066068 A1 | 4/2003 | Gutta et al. |
| 2003/0072440 A1 | 4/2003 | Murray et al. |
| 2003/0081937 A1 | 5/2003 | Li |
| 2003/0093793 A1* | 5/2003 | Gutta .......................... 725/46 |
| 2003/0105682 A1 | 6/2003 | Dicker et al. |
| 2003/0182663 A1 | 9/2003 | Gudorf et al. |
| 2003/0187650 A1 | 10/2003 | Moore et al. |
| 2003/0229900 A1 | 12/2003 | Reisman |
| 2004/0003041 A1 | 1/2004 | Moore et al. |
| 2004/0015569 A1 | 1/2004 | Lonnfors et al. |
| 2004/0017389 A1 | 1/2004 | Pan et al. |
| 2004/0030750 A1 | 2/2004 | Moore et al. |
| 2004/0032486 A1 | 2/2004 | Shusman |
| 2004/0088289 A1 | 5/2004 | Xu et al. |
| 2004/0098754 A1 | 5/2004 | Vella et al. |
| 2004/0125124 A1 | 7/2004 | Kim et al. |
| 2004/0125877 A1 | 7/2004 | Chang et al. |
| 2004/0197088 A1 | 10/2004 | Ferman et al. |
| 2004/0227768 A1 | 11/2004 | Bates et al. |
| 2004/0231003 A1 | 11/2004 | Cooper et al. |
| 2005/0102202 A1 | 5/2005 | Linden et al. |
| 2005/0262542 A1 | 11/2005 | DeWeese et al. |

FOREIGN PATENT DOCUMENTS

| | | |
|---|---|---|
| JP | 08125957 | 5/1996 |
| JP | 09322154 | 12/1997 |
| JP | 2000-229577 | 8/2000 |
| JP | 2001-036861 | 2/2001 |
| JP | 2001-085717 | 3/2001 |
| JP | 2001-206550 | 7/2001 |
| JP | 2002-503896 | 2/2002 |

| | | |
|---|---|---|
| WO | WO 94/14284 | 6/1994 |
| WO | WO 99/04143 | 1/1999 |
| WO | WO 99/12194 | 3/1999 |
| WO | WO 99/65237 | 12/1999 |
| WO | WO 01/50753 | 7/2001 |

OTHER PUBLICATIONS

"A Proposal for User Preference Descriptions in MPEG-7," ISO/IEC JTC1SC29/WG11 M5222, MPEG 99, Oct. 4, 1999, pp. 1-6.

Michael G. Christel, Alexander G. Hauptmann, Adrienne S. Warmack, Scott A. Crosby, "Adjustable Filmstrips and Skims as Abstractions for a Digital Video Library," Computer Science Department, Carnegie Mellon University, Pittsburgh, PA 15213 USA.

Peng Xu, et al., "Algorithms and System for High-Level Structure Analysis and Event Detection in Soccer Video," Columbia University, Advent—Technical Report #111, Jun. 2001.

Keith Millar and David White, "A Schema for TV-Anytime: Segmentation Metadata AN195," NDS Contribution from MyTV, NDS Limited 2000, 27 pages.

Keith Millar et al., "A Schema for TV-Anytime Segmentation Metadata AN195rl myTV project," NDS Systems Division, NDS Limited 2000, 28 pages.

S.E. Levinson, L. R. Rabiner, and M M. Sondhi, "An Introduction to the Application of the Theory of Probabilistic Functions of a Markov Process to Automatic Speech Recognition," Copyright 1983 American Telephone and Telegraph company. The Bell system Technical Journal, vol. 62, No. 4, Apr. 1983, pp. 1035-1074.

Dennis Yow, et al., "Analysis and Presentation of Soccer Highlights from Digital Video," To appear in the Proceedings, Second Asian Conference on Computer Vision (ACCV '95).

Drew D. Saur, et al. "Automated Analysis and Annotation of Basketball Video," SPIE vol. 3022, pp. 176-187, 1997.

Hao Pan, et al., "Automatic Detection of Replay Segments in Broadcast Sports Programs by Detection of Logos in Scene Transitions," 2002 IEEE, pp. IV-3385-IV-3388.

Yihong Gong, et al., "Automatic Parsing of TV soccer Programs," 1995 IEEE, pp. 167-174.

Drew D. Saur, et al. "Automated Analysis and Annotation of Basketball Video," SPIE vol. 3022, pp. 176-187, 1997.

Yong Rui, et al. "Automatically Extracting Highlights for TV Baseball Programs," ACM Multimedia 2000 Los Angeles, CA, USA, pp. 105-115.

Nuno Vasconcelos and Andrew Lippman, "Bayesian Modeling of Video Editing and Structure: Semantic Features for Video Summarization and Browsing," 1998 IEEE, pp. 153-157.

Padhraic Smyth, "Belief Networks, Hidden Markov Models, and Markov Random Fields: a Unifying View," To appear in Pattern Recognition Letters, 1998, Information and Computer Science Department, University of California, Irvine, CA 92697-93425, Mar. 20, 1998.

Padhraic Smyth, "Belief Networks, Hidden Markov Models, and Markov Random Fields: a Unifying View," To appear in Pattern Recognition Letters, 1998, Information and Computer Science Department, University of California, Irvine, CA 92697-93425, Mar. 20, 1998.

Franklin Reynolds, et al. "Composite Capability/Preference Profiles (CC/PP): A user side framework for content negotiation," W3C Note Jul. 27, 1999, http://www.w3.org/1999/07/NOTE-CCPP-19990727/, 15 pages.

T. Lambrou, et al., "Classification of Audio Signals Using Statistical Features on Time and Wavelet Transform Domains," 1998 IEEE, pp. 3621-3624.

Joshua Alspector, et al., "Comparing Feature-based and Clique-based User Models for Movie Selection," Digital Libraries 98, Pittsburgh, PA, Copyright ACM 1998, pp. 11-18.

Rainer Lienhart, "Comparison of Automatic Shot Boundary Detection Algorithms," Part of the IS&T/SPIE conference on Storage and Retrieval for Image and Video Databases VII, San Jose, CA, Jan. 1999, SPIE vol. 3656, pp. 290-301.

John Canny, "A Computational Approach to Edge Detection,"IEEE Transactions on Pattern Analysis and Machine Intelligence, vol. PAMI-8, No. 6, Nov. 1986, IEEE 1986, pp. 679-698.

Richard Qian et al., "A Computational Approach to Semantic Event Detection," 1999 IEEE, pp. 200-206.

F. Arman, et al., "Content-based Browsing of Video Sequences," to appear in the Proceedings of ACM International Conference on Multimedia '94, Oct. 15-20, San Francisco, CA, 7 pages.

Hongjiang Zhang, et al. "Content-Based Video Browsing Tools," SPIE vol. 2417, 1995, pp. 389-398.

Stephen W. Smoliar, et al. "Content-Based Video Indexing and Retrieval," 1994 IEEE, pp. 62-72.

Stefan Eickeler, et al., "Content-based Video Indexing of TV Broadcast News Using Hidden Markov Models," Proceedings of IEEE International Conference on Acoustics, Speech, and Signal Processing, Phoenix, AZ, 1999, 4 pages.

Kathy Bohrer and Bobby Holland, editors, "Customer Profile Exchange (CPExchange) Specification," Oct. 20, 2000, Version 1.0, International digital Enterprise Alliance, Inc. (IDEAlliance), pp. 1-27.

Jane Hunter (DSTC Pty Ltd), Editor, "DDL Working Draft 3.0," ISO/IEC JTC1/SC29/WG11 N3391, MPEG 00/May 2000 (Geneva), 23 pages.

Vikrant Kobla, et al. "Detection of Slow-Motion Replay Sequences for Identifying Sports Videos," Laboratory for Language and Media Processing. University of Maryland, College Park, MD 20742-3275, USA, 6 pages.

Richard J. Qian, et al. "Description Schemes for Consumer Video Applications," Proposal ID 429, ISO/IEC JTC1/SC29/WG11 - MPEG-7 Proposal, Feb. 1999.

Zhu Liu and Qian Huang, "Detecting News Reporting Using Audio/Visual Information," 1999 IEEE, pp. 324-328.

Y Kawai, "Detection of Replay Scenes in Broadcasted Sports Video by focusing on digital Video Effects," IEICE (D-II), vol. J84-D-II, No. 2, pp. 432-435, Feb. 2001, (In Japanese), pp. 432-437.

Vikrant Kobla, et al., "Detection of Slow-Motion Replay Sequences for Identifying Sports Videos," Laboratory for Language and Media Processing, University of Maryland, College Park, MD 20742-3275, USA, pp. 135-140.

H. Pan, et al. "Detection of Slow-Motion Replay Segments in sports Video for Highlights Generation," Proceedings of IEEE International Conference on Acoustics, Speech, and signal Processing, Salt Lake City, UT, 2001, 4 pages.

Alan E Bell, "The dynamic digital disk," IEEE Spectrum, Oct. 1999, pp. 28-35.

Baoxin Li and M. Ibrahim Sezan, "Event Detection and Summarization in Sports Video," Sharp Laboratories of America, 5750 NW Pacific Rim Blvd., Camas, WA 98607, USA, 5 pages.

Minerva Yeung, "Extracting Story Units from Long Programs for Video Browsing and Navigation," Proceedings of Multimedia 1996, 1996 IEEE, pp. 296-304.

Boon-Lock Yeo et al., "On the Extraction of DC Sequence from MPEG Compressed Video," 1995 IEEE, pp. 260-263.

Fap Specifications, MPEG-4 Compliant Facial Animation, http://www.dsp.dist.unige.it/~pok/Research/MPEG/fapspec.htm, 4 pages.

Frank R. Kschischang, et al., "Factor Graphs and the Sum-Product Algorithm," IEEE Transactions on Information Theory, vol. 47, No. 2, Feb. 2001, pp. 498-519.

John S. Boreczky, et al. "A Hidden Markov Model Framework for Video Segmentation Using Audio and Image Features," Proceedings of IEEE International Conference on Acoustics, Speech, and Signal Processing, Seattle, WA, 1998, 4 pages.

Wayne Wolf, "Hidden Markov Model Parsing of Video Programs," Proceedings of the 1997 IEEE International Conference on Acoustics, Speech, and Signal Processing (ICASSP '97), pp. 2609-2611.

Bilge Gunsel, et al., "Hierarchical Temporal video Segmentation and content Characterization," Dept. of Electrical Engineering and Center for Electronic Imaging Systems, University of Rochester, Rochester, NY 14627, SPIE vol. 3229, 1997.

M. R. Naphade, et al. "A High-Performance Shot Boundary Detection Algorithm Using Multiple Cues," Proceedings of IEEE International Conference on Image Processing, Chicago, IL, 1998, pp. 884-887.

Josh Bernoff, "How Cable TV Can Beat Satellite," WholeView TechStrategy Rsearch, Apr. 2002 Forrester Research, Inc. 400 Technology Square, Cambridge, MA 02139 USA.

Vikrant Kobla, et al., "Identifying sports videos using replay, text, and camera motion features," Laboratory for Language and Media Processing, University of Maryland, College Park, MD 20742-3275, USA.

B. B. Chaudhuri, et al., "Improved fractal geometry based texture segmentation technique,"IEE Proceedings-E, vol. 140, No. 5, Sep. 1993, pp. 233-241.

Toshio Kawashima, et al., "Indexing of Baseball Telecast for Content-based Video Retrieval," Dept. of Information engineering, Hokkaido University, Kita-13, Nishi-8, Sapporo, 060-8628, Japan, 1998 IEEE, pp. 871-874.

Nathaniel J. Thurston, et al. "Intelligent Audience guidance: The New Paradigm in Television Navigation," Predictive Networks, Inc., Feb. 21, 2002, 9 pages.

Dulce Ponceleon, et al. "Key to Effective Video Retrieval: Effective Cataloging and Browsing," ACM Multimedia '98. Bristol, UK, 1998, pp. 99-107.

Henry Lieberman, et al. "Let's Browse: A collaborative Web Browsing Agent," Massachusetts Institute of Technology, 20 Ames Street #E15-305, Cambridge, MA 02139, USA, Copyright ACM 1999, pp. 65-68.

Noboru Babaguchi, et al., "Linking Live and Replay Scenes in Broadcasted Sports Video," ACM Multimedia Workshop. Marina Del Rey. CA, USA, Copyright ACM 2000, pp. 205-208.

Giridharan Iyengar, et al., "Models for automatic classification of video sequences," SPIE vol. 3312, 1997, pp. 216-227.

Nevenka Dimitrova, et al., "Motion Recovery for Video Content Classification," ACM Transactions on Information Systems, vol. 13, No. 4, Oct. 1995, pp. 408-439.

DDL Group, "MPEG-7 Description Definition Language Document V 2," ISO/IEC JTC1/SC29/WG11/N2997, Oct. 1999/Melbourne, 56 pages.

Description Scheme Group, "MPEG-7 Description Schemes (V0. 5)," ISO/IEC JTC1/SC29/WG11 N2844, MPEG 99, Jul. 1999, Vancouver, pp. 1-59.

Description Scheme Group, "MPEG-7 Generic AV Description Schemes (V0.7)," MPEG 99, Oct. 1999, Melbourne.

AHG on MPEG7 Media/Meta DSs and Harmonization with other Schemes, "MPEG-7 Media/Meta DSs upgrade (V0.2)," ISO/IEC JTC1/SC29/WG11 Mxxxx, MPEG 99 Oct. 1999, Melbourne, pp. 1-17.

Peter Van Beek, et al, Editors, "MPEG-7 Multimedia Description Schemes WD (Version 3.0)," ISO/IEC JTC1/SC29/WG 11/N3411, May 2000, Geneva.

Peter Van Beek, et al., Editors, "MPEG-7 Multimedia Description Schemes XM (Version 3.0)," ISO/IEC JTC1/SC29/WG 11/N3410, May 2000, Geneva.

P. Van Beek et al., "MPEG-7 Requirements for Description of Users," ISO/IEC JTC1/SC29/WG11, MPEG99/4601, Mar. 1999, 5 pages.

F. Pereira, Editor, "MPEG-7 Requirements Document V.9," ISO/IEC JTC1/SC29/WG11/N2859, Jul. 1999/Vancouver (Canada).

Sylvie Jeannin, et al., Editors, "MPEG-7 Visual part of eXperimentation Model Version 6.0," ISO/IEC JTC1/SC29/WG11/N3398, Geneva, Jun. 2000.

Kaushal Kurapati, et al., "A Multi-Agent TV Recommender," Adaptive Systems Department, Philips Research Briarcliff, 345 Scarborough Rd., Briarcliff Manor, NY 10510, USA.

Jane Hunter (DSTC Pty Ltd.), "Text of ISO/IEC CD 15938-2 Information technology—Multimedia content description interface—Part 2 Description definition language," ISO/IEC JTC1/SC29/WG11 N3702, MPEG 00/3702, Oct. 2000 (La Baule).

"Information Technology - Multimedia Content Description Interface—Part 5: Multimedia Description Schemes," ISO/IEC JTC 1/SC 29 N 3705, Nov. 17, 2000, ISO/IEC CD 15938-5.

Peter Van Beek, et al., "Text of 15938-5 FCD Information Technology—Multimedia Content Description Interface—Part 5 Multimedia Description Schemes," ISO/IEC JTC 1/SC 29 N3966 Mar. 12, 2001, 500 pages.

Yao Wang, et al., "Multimedia Content Analysis," IEEE Signal Processing Magazine, Nov. 2000, pp. 12-35.

Mark T. Maybury, et al., "Multimedia Summaries of Broadcast News," Advanced Information Systems Center, The MITRE Corporation, 202 Burlington Road, Bedford, MA 01730, USA, pp. 442-449.

Shinichi Satoh, et al., "Name-It: Association of Face and Name in Video," School of Computer Science, Carnegie Mellon University, Pittsburgh, PA 15213, Dec. 20, 1996, 19 pages.

Stuart J. Golin, "New metric to detect wipes and other gradual transitions in . . . " Part of the IS&T/SPIE Conference on Visual communications and Image Processing '99, San Jose, CA Jan. 1999, SPIE vol. 3653, pp. 1464-1474.

Ullas Gargi, et al., "Transactions Letters: Performance Characterization of Video-Shot-Change Detection Methods," IEEE Transactions on Circuits and Systems for Video Technology, vol. 10, No. 1, Feb. 2000, 13 pages.

Michael Ehrmantraut, et al., "The Personal Electronic Program guide - Towards the Pre-selection of Individual TV Programs," 1996 ACM, pp. 243-250.

Marc Light, et al., "Personalized Multimedia Information Access," Communications of the ACM, vol. 45, No. 5, May 2002, pp. 54-59.

Kyoungro Yoon, et al., "Proposal of Usage History DS," ISO/IEC JTC1/SC29/WG11, MPEG00/M6259, Jul. 2000, Beijing.

Michael T. Chan, et al., "Real-Time Lip Tracking and Bimodal Continuous Speech Recognition," Rockwell Science Center, 1049 Camino Dos Rios, Thousand Oaks, CA 91360, 6 pages.

Boon-Lock Yeo, et al., "Retrieving and Visualizing Video," Communications of the ACM, Dec. 1997, vol. 40, No. 12, pp. 43-52.

H. B. Lu, et al., "Robust Gradual Scene Change Detection," Proceedings of IEEE International Conference on Image Processing, Kobe, Japan, 1999, 5 pages.

Richard J. Qian, et al., "A Robust Real-Time Face Tracking Algorithm," Sharp Laboratories of America, 5750 N.W. Pacific Rim Blvd., Camas, WA 98607, 1998 IEEE, pp. 131-135.

Lexing Lie, "Segmentation and Event Detection in Soccer Audio," EE 6820 Project, Soccer Audio, May 15, 2001, 9 pages.

Riccardo Leonardi, et al., "Content-Based Multimedia Indexing and Retrieval: Semantic Indexing of Multimedia Documents," IEEE 2002, pp. 44-51.

R. W. Picard, "A Society of Models for Video and Image Libraries," IBM Systems Journal, vol. 35, No. 3 & 4, 1996, pp. 292-312.

Alberto Del Bimbo, et al., "A Spatial Logic for Symbolic Description of Image Contents," Journal of Visual Languages and Computing (1994) 5, pp. 267-286.

Jin-Soo Lee, et al. Editors, "Specification of The UsageHistory DS," ISO/IEC JTC 1/SC 29/WG 11/M5748, Mar. 2000, Noordwijkerhout, pp. 1-6.

Lexing Xie, et al., "Structure Analysis of Soccer Video with Hidden Markov Models," Department of Electrical Engineering, Columiba University, New York, NY, 4 pages.

Selim Aksoy, et al., "Textural Features for Image Database Retrieval," Intelligent Systems Laboratory, Department of Electrical Engineering, University of Washington, Seattle, WA 98195-2500, 5 pages.

B. S. Manjunath, et al., "Texture Features for Browsing and Retrieval of Image Data," IEEE Transactions on Pattern Analysis and Machine Intelligence, vol. 18, No. 8, Aug. 1996, pp. 837-842.

Richard W. Conners, et al., "A Theoretical comparison of Texture Algorithms," IEEE Transactions on Pattern Analysis and Machine Intelligence, vol., PAMI-2, No. 3, May 1980, pp. 204-222.

Noboru Babaguchi, "Towards Abstracting Sports Video by Highlights," ISIR, Osaka University, Ibaraki, Osaka 567-0047, Japan, 2000 IEEE, pp. 1519-1522.

Stephen S. Intille, "Tracking Using a Local Closed-World Assumption: Tracking in the Football Domain," MIT Media Lab Perceptual computing group Technical Report No. 296, pp. 1-62.

Lawrence R. Rabiner, "A Tutorial on Hidden Markov Models and Selected Applications in Speech Recognition," Proceedings of the IEEE, vol. 77, No. 2, Feb. 1989, pp. 257-286.

Jim Stroud, "TV Personalization: A Key Component of Interactive TV," The Carmel Group, 2001, 9 pages.

Ted Lewis, "UbiNet: The Ubiquitous Internet Will Be Wireless," DaimlerChrysler Research & Technology North America, 3 pages.

Richard O. Duda et al., "Use of the Hough Transformation To Detect Lines and Curves in Pictures," Communications of the ACM, Jan. 1972, vol. 15, No. 1, pp. 11-15.

"User Preference Descriptions for MPEG-7," ISO/IEC JTC1/SC29/WG11, MPEG 99/MXXXX, Maui, Hawaii, Dec. 1999, pp. 1-18.

Rainer Lienhart, et al., "Video Abstracting," Communications of the ACM, Dec. 1997/ vol. 40, No. 12, pp. 55-62.

Shingo Uchihashi, et al., "Video Manga: Generating Semantically Meaningful Video Summaries,"FX Palo Alto Laboratory, 3400 Hillview Avenue, Palo Alto, CA 94304, USA, pp. 383-392.

Michael A. Smith, et al., "Video Skimming for Quick Browsing based on Audio and Image Characterization," School of Computer Science, Carnegie Mellon University, Pittsburgh, PA 15213, Jul. 30, 1995, 24 pages.

Daniel Dementhon, et al., "Video summarization by Curve Simplification," Language and Media Processing (Lamp), University of Maryland, College Park, MD 20742-3275, 1998 ACM, pp. 211-218.

Chung-Lin Huang, et al., "Video summarization using Hidden Markov Model," Electrical Engineering Department, National Tsing-Hua University, Hsin-Chu, Taiwan, ROC, 2001 IEEE, pp. 473-477.

Ken Masumitsu, et al., "Video Summarization Using Reinforcement Learning in Eigenspace," IBM Research, Tokyo Research Laboratory, 1623-14, Shimotsuruma, Yamato-shi, Kanagawa, Japan, 4 pages.

Yihong Gong, et al., "Video Summarization Using Singular Value Decomposition," C&C Research laboratories, NEc USA, Inc. 110 Rio Robles, San Jose, CA 95134, USA, 2000 IEEE, 7 pages.

Yihong Gong, et al., "Video Summarization with Minimal Visual Content Redundancies," C&C Research Laboratories, NEC USA, Inc., 110 Rio robles, San Jose, CA 95134, USA, 2001 IEEE, pp. 362-365.

Minerva M. Yeung, et al., "Video visualization for Compact Presentation and Fast Browsing of Pictorial Content," IEEE Transactions on Circuits and Systems for Video Technology. vol. 7, No. 5, Oct. 1997, pp. 771-785.

Stephen S. Intille, et al., "Visual Tracking Using closed-Worlds,", MIT Media Laboratory Perceptual computing Section Technical Report No. 294, Nov. 1994, pp. 1-18.

Leszek Cieplinski, et al. "Visual Working Draft 3.0," ISO/IEC JTC1/SC29/WG11/N3399, Jun. 2000 (Geneva), 92 pages.

Sunghoon Choi, et al., "Where are the ball and players?: Soccer Game Analysis with Color-based Tracking and Image Mosaick," Dept. of EE Pohang University of Science and Technology, San 31 Hyoja Dong, Pohang, 790-784, Republic of Korea, pp. 1-15.

http://web.archive.org/web/20001017172449/http://www.pvi-inc.com/.

David Beech, et al., editors, "XML Schema Part 1: Structures," http://www.w3.org/1999/05/06-xmischema-1/, W3C Working Draft, May 6, 1999, 67 pages.

Paul V. Birch, et al., editors, "XML Schema Part 2: Datatypes, World Wide Web Consortium Working Draft," May 6, 1999, http://www.w3.org/1999/05/06-xmischema-2/, 37 pages.

* cited by examiner

NETWORKED VIDEO DEVICES

CROSS REFERENCE TO RELATED APPLICATIONS

This application is a continuation-in-part of U.S. patent application Ser. No. 10/906,754, filed Mar. 4, 2005, which claims the benefit of U.S. Provisional App. No. 60/550,301, filed Mar. 4, 2004 and U.S. Provisional App. No. 60/629,726, filed Nov. 19, 2004.

BACKGROUND OF THE INVENTION

The present invention relates to collaborative information systems.

Users watching video content on a television are not always available when a particular show is broadcast. In order to permit watching a video at a later time or otherwise the video, personal video recorders have been developed which permit the user to record the video content on a storage device and play it at a later more convenient time. Existing personal video recorders include the capability of creating and updating a user profile of the user's viewing habits. Based upon this user profile, the system may filter potential content and provide the user with recommendations. Accordingly, for a particular television set and an associated personal video recorder in a user's home, the personal video recorder may create a user profile which is used to recommend potential video content to the user.

Some existing Internet based shopping based websites, particularly those related to selling books, track in some manner the previous selections of different users. The website may track a trend such as the users tendency to purchase a particular first book together with a particular second book. The data collected may then be used to provide recommendations when another user indicates a preference to purchase either the first or second book by presenting the other book as being of possible interest. While the information may be of possible use, there is no indication of the source of the data or otherwise how such a recommendation was made, or the identification and background of those other users. In many cases, the recommended book may be of little to no interest to the particular user.

DETAILED DESCRIPTION OF THE PREFERRED EMBODIMENT

General Overview

Figure 1:
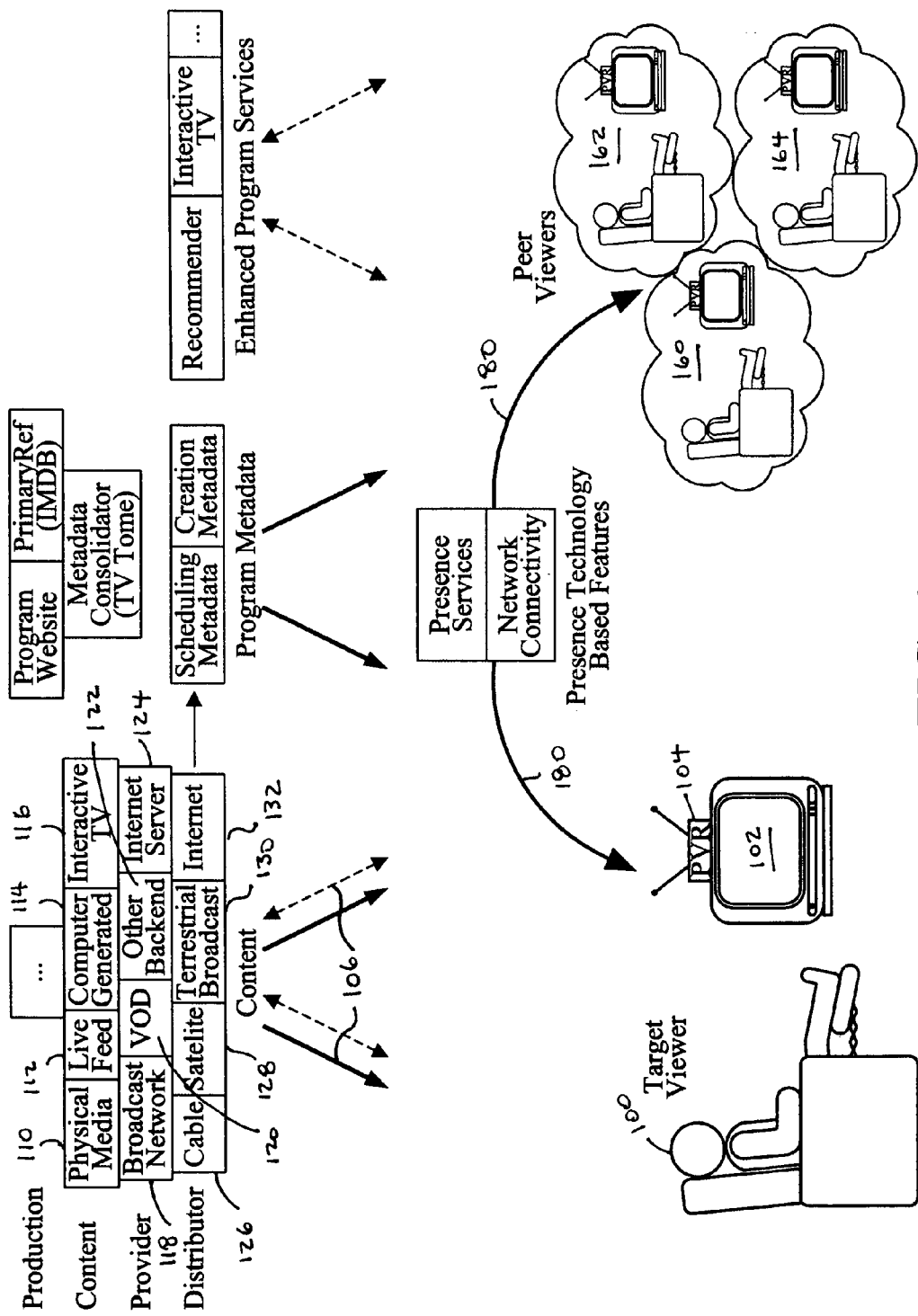
FIG. 1 is a context diagram.

Referring to FIG. 1, a video based system includes a user 100 who watches or otherwise consumes audiovisual content provided to the user in some manner. In many cases the audiovisual content is provided on a display 102 which may be interconnected to a personal video recorder 104. The personal video recorder 104 may be any type of device that receives a video signal or otherwise video content and stores the video content for later use, such as on a hard drive or optical storage medium. In some cases, the personal video recorder may provide links or otherwise access to network locations from which the video is available, normally video on-demand. The display 102 can also have a network connection for communication with a network. Also, the display 102 can be provided with or without an associated personal video recorder 104. In some cases, the video content in that case would be on other devices or a server device, such as video on demand (VOD), TV broadcast, or Internet. For example, the TV may be an Internet Protocol (IP) capable television for receiving data and/or video, together with broadcast television, if desired. The video content 106 may be provided from any source, such as for example, the content may be provided by physical media 110, live video feed 112, computer generated video 114, interactive television 116; the provider of the video may be broadcast network 118, video on demand 120, other backend source 122, Internet server 124; and the distributor of the video may be cable 126, satellite 128, terrestrial broadcast 130, and Internet 132. Information related to the audiovisual content may be provided as program metadata 140 from any source, such as for example, program website 142, primary reference (e.g., MDB) 144, metadata consolidator (e.g., TV Tome) 146, scheduling metadata 148, creation metadata 150, and descriptive metadata 152. Other user's 160, 162, 164 (generally referred to as peers) may have access to at least some of the same (or similar) audiovisual content and some of the same (or similar) program metadata 140. The users 100, 160, 162, and 164 may also have access to the same (or similar) enhanced services 166, such as for example, recommendations 168, and interactive TV 170.

Existing personal video systems are based upon the premise that a particular personal video recorder is coupled with a single television for recording and recommending content for a particular user(s) of that device. Further, current personal video recorders are based upon a premise that upon the viewing habits of the user are sufficiently effective for making additional content recommendations. The recommendations may be provided by the personal video recorder or otherwise from a service provider. In contrast to this model, the preferred embodiment includes networking together multiple personal video recorders or otherwise multiple display devices (such as TV, computer, mobile phones, or otherwise) in order to share information in order to achieve functionality that would normally not be available without such interconnectivity. A network 180 interconnects multiple personal video recorders together, which may be in the form of the Internet, local area network, wide area network, wireless network, direct connection, telephone interconnectivity, wireless network, or otherwise. In addition, the system permits one to explore beyond the user's own viewing habits so that the viewer can discover new content. Moreover, the system permits the user to enhance their own recommendations based upon other networked users.

In many cases, a group of users (e.g., a group of friends) are separately and simultaneously viewing the same, different, or similar video content. In most cases, this separate viewing occurs without the other users being aware of each other, aware if others user are currently viewing content ("off line" or 'on-line'), or otherwise aware of what content each other is viewing. In addition, in most cases the different viewers are unaware of the content preferences of the other viewers. In the event that a user was aware of the presence of the other users, such as whether they are currently viewing content or not currently viewing content, then the user may be able to use this presence based information in the recommendation of suitable content. Preferably, the currently viewed content by a user is shared with other user's in a manner so that a user may obtain recommendations for suitable content. In addition, other data from viewers currently viewing content may likewise be shared with other user's in a manner so that a user may obtain recommendations for suitable content.

To most effectively implement such a system, the users publish data to other users and likewise subscribed to data from other users within the presence based collaborative recommendation system. A comprehensive collection of publisher recommendation data is disseminated and an expended/aggregated set of this recommendation data is received by the subscriber. The recommendations made by the publisher may be automatically generated by the system or otherwise provided manually. The recommendations may be filtered in any suitable manner for the particular subscriber and for privacy concerns of both publishers and/or subscribers.

The presence based system may arrange the publishers as sets of viewers in a variety of different arrangements. The recommendations originating from the publishing viewers may include, for example, current program selection, noted selections, accumulated/refined program selections (such as based upon usage history), content selection, preference descriptions, and channel selections, where program and content selection include program and content watching or otherwise recording. The recommendations may be filtered for minimum selection preference characteristics, maximum selection preference characteristics, and sufficient continuity durations to prevent undesired channel-surfing recommendations. In addition, the recommendations may be localized for the subscriber's content availability and novelty. The recommendations from multiple publishers may be combined in a collaborative manner to provide, for example, statistical averaging, cross-group collaboration, interest indices, statistical metrics, context index weighting and accumulated collaboration.

The presence based system may include content consumption recommendations. These recommendations may be provided from a user's publishing viewer set and may refer to and describe recommended segments of a video content. In many cases, these segment or summary descriptions are generated for recorded, and time—shifted programs, which may be annotated and edited.

The presence based system may include the viewer sets being organized in a variety of different ways. The viewer sets may each include different privacy and permission attributes. In addition, the viewer sets may be organized as one-to-one, multiple viewers, or hierarchical combinations. Subscribers may join one or more viewer sets, each of which may have a different organization, privacy attribute, and permission attributes. The presence based collaborative system provides a social context to content selection and consumption, and enables sharing of content selection choices and recommendations among users that belong to certain viewer sets.

The presence based system may provide a remote control device with the capability of content selection, capture, and browsing. The remote control device may be linked to a controller, such as a publishing viewer, or a source of program summarizations. The controller may shift to different entities during a typical session. The subscribers that are concurrently linked to the same controller in this fashion concurrently consume and co-view the same program rendition. The publisher program timepoint/offset may be shifted to accommodate concurrent browsing control.

The presence based system may include conversational communication, and include content-integrated virtual viewer environments. Conversational communication may include instant messaging, voice over IP, video over IP, or videoconferencing over IP. To assist with navigation, the environment may include onscreen pointers, onscreen markup pens, and other presentation and navigation tools. In addition, the conversational communication may include avatars and avatar-like self representations. The conversational communication may be triggered by any event, such as the system, plug-ins, on occurrence of an event, or otherwise manually.

The presence based system may include supplementary related recommendations. Supplementary recommendations include program selections, media delivery options, program summarization descriptions, and related descriptive material. Supplementary recommendations may be provided by cross-group viewer sets or commercial or other affiliated organizations.

System Configuration

Figure 2:
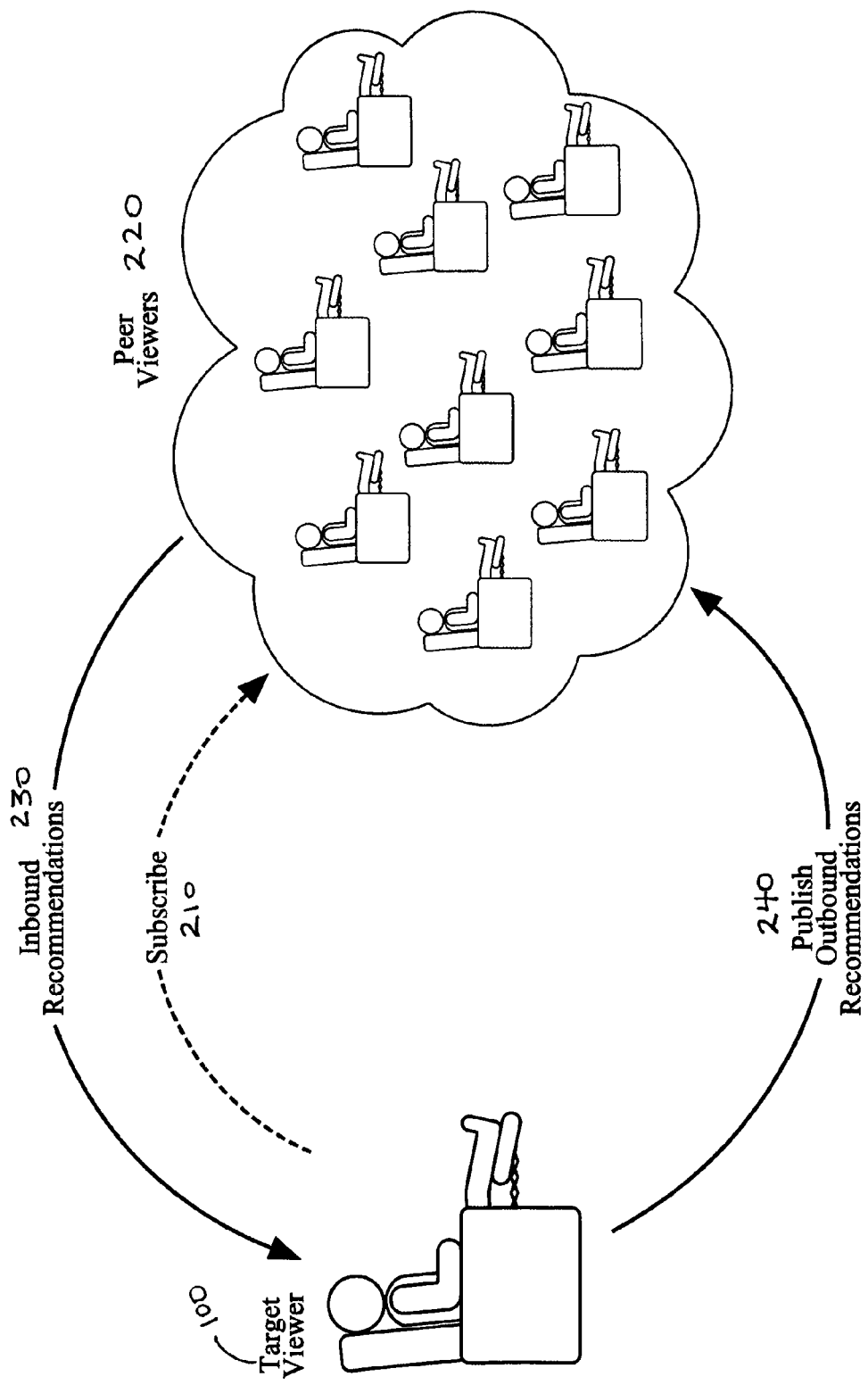
FIG. 2 is a presence technology system.

Referring to FIG. 2, the user 100 (also referred to as target viewer) may join 210 other users 220 (also referred to as peer viewers) across the network 180. In this manner, the target viewer 100 may exchange data with the peer viewer(s) 220. The target viewer 100 may exchange data related to videos with the peer viewers 220 in a variety of different manners, described later. Based upon joining with other viewer(s) the target viewer 100 establishes an inbound path 230 for recommendations or otherwise data to be received from other viewers 220 (or a server). Based upon joining with other viewers 220 the target viewer 100 establishes an outbound path 240. Based upon requests or otherwise, the target viewer 100 may provide recommendations or otherwise data to other peer viewers 240 (or a server). It is noted that the target viewer 100 may join 210 multiple different peer viewer sets which may be used for the same or different recommendations 230 and 240.

In order to achieve an efficient implementation, it is desirable to include a framework within which data can be exchanged in an efficient manner. In addition, the framework should include an effective manner in which to find, retrieve, and subscribe to changes in presence information (e.g., "online" or "offline") of other users.

Figure 3:
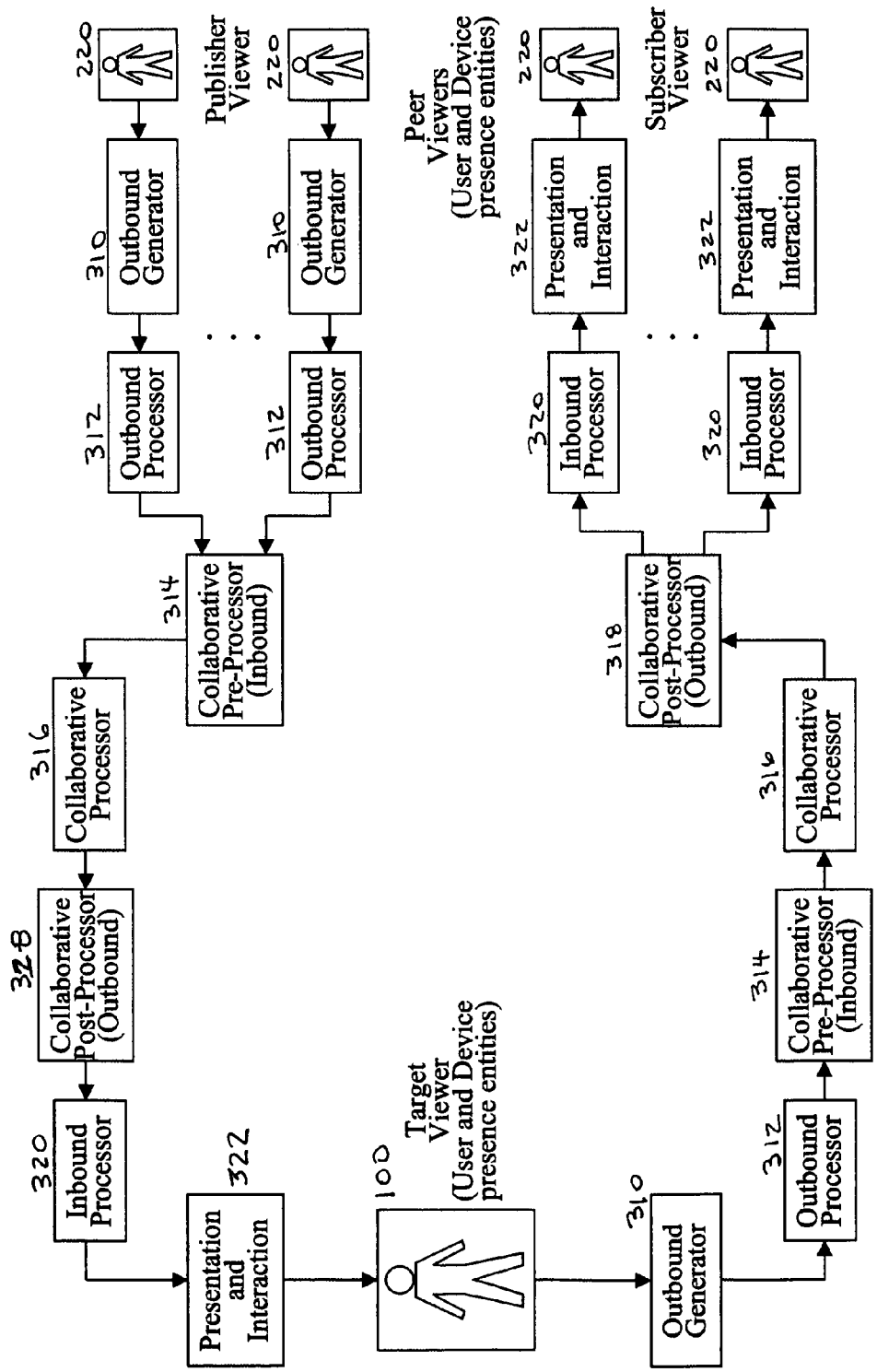
FIG. 3 illustrates processing nodes.

Referring to FIG. 3, an exemplary system by which recommendations may be provided and received is illustrated. It is noted that the "upper" and "lower" paths may be essentially mirror images of one another so that when the target viewer publishes to peer viewers and when peer viewers publish to the target viewer the same processing sequence may be performed. While FIG. 3 illustrates each peer as a separate publisher and subscriber, in most cases the publisher and subscriber are typically comprised of both. In addition, the recommendations may be determined by the target viewer 100, based upon received data, or otherwise the recommendations are provided to the target viewer.

The viewers (target or peer) are at the endpoints of the system. In some contexts, the human user and the local content manager device (e.g., personal video recorder) are separate entities. For instance, the personal video recorder device may be "online" while the human user is not present ("offline"), the personal video recorder device may be "online" while the user is "online," the personal video recorder device may be "offline" while the user is "offline," or the personal video recorder device may be "offline" while the human user is "online" with the content being provided from a different device or server. In many cases, the presence of either the user, the content management device, or both may be important.

As the user views programs or otherwise navigates through content, one or more parts of the system may create or otherwise provide, information regarding interrelationships between different programs and the suitability of particular content for a particular viewer. In addition, interrelationship information may be explicitly provided by the user, if desired. In some cases, the information provided or created may be in the form of TV-Anytime compliant metadata. The outbound generator 310 receives information (which may be "raw" or "processed") and in response provides information, which may be in a generally unprocessed format, of potential recommendations for video content.

In many cases, the data provided by the content management device may be unsuitable in its current form for effective use by others. For example, the data may include personal information, proprietary data which would be of little to no use for others, or general data that is not useful for sharing with others. In some cases, the user may select one of multiple different privacy thresholds, and as such different data or different amounts of data may be shared with others.

An outbound processor 312 may perform filtering of the data from the outbound generator 310 based upon the privacy settings, personal information, proprietary data, etc. to remove unnecessary data from being forwarded to others. In addition, the outbound processor 312 may augment the data from the outbound generator 310 with additional information to make the data more suitable for others to use. Also, the outbound processor 312 may format the data to a format suitable for other devices. Also, in some cases there may be a large amount of different data sets being provided to others, in this case, it may be desirable to reduce the amount of data to a more manageable amount. This is of particular value when the receiving device has limited computational resources. In such case, the outbound processor 312 may aggregate different data together to reduce the amount of data. Further, the outbound processor 312 may perform the initial routing of the data to one or more other devices or users. In this manner, appropriate data will be provided to appropriate device(s).

Within the system there are multiple data sets that may be representative of similar data, such as data from two separate publishers. In this case, it may be useful to further reduce the amount of data being transmitted to target viewers by removing redundancy or otherwise reducing the amount of data. A collaborative pre-processor 314 may perform filtering operations on the data from a plurality of different publishers, primary to reduce redundancy.

A collaborative processor 316 may perform aggregation and collaborative filtering functionality, if desired, on the data from a plurality of different publishers.

A collaborative post-processor 318 may perform filtering and routing functions, if desired, on the data from a plurality of different publishers.

An inbound processor 320 may perform filtering and augmentation functions.

A presentation and interaction processor 322 may format the recommendations for presentation to the user and provide a structure for the user to interact and act upon the recommendation.

It is to be understood that the components of the system may be distributed across the network in any suitable manner. In general, it is preferable that the outbound processes, the inbound processor, and the presentation and interaction processes are co-located with the viewer. Generally, both the outbound and inbound processes are co-located with the viewer. The collaborative processes (pre-, post- and base) may be located at the viewers, or preferably centrally located as a server, or combined in a peer-to-peer architecture.

Recommender

Figure 4:
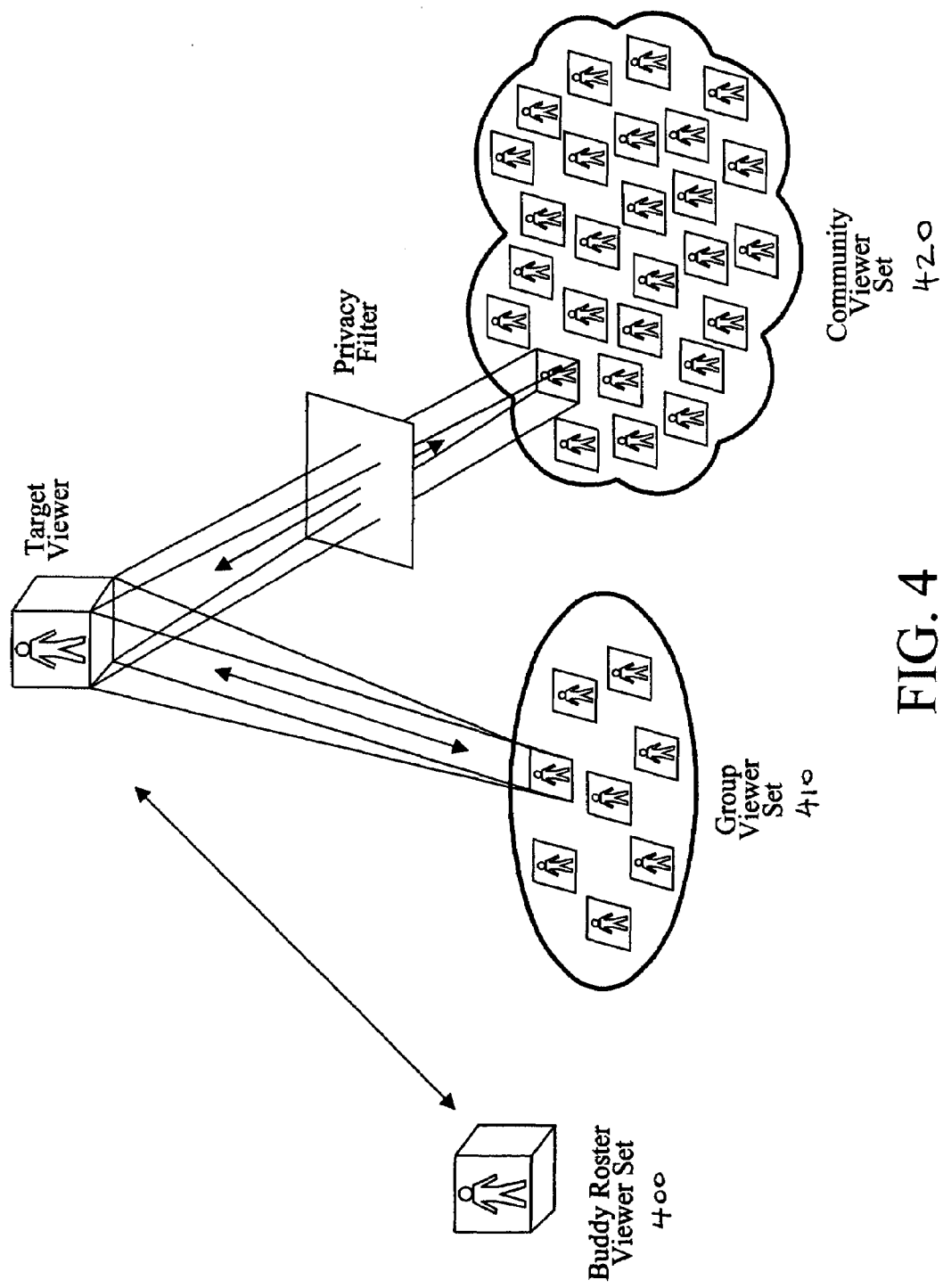
FIG. 4 illustrates viewer set collection types.

Referring to FIG. 4, a viewer set is the collection of peer viewers that provides collaborative recommendations to the target viewer. This may be referred to as the publishing viewer set. An extension is that the target viewer may "join" a viewer set, and the combined viewer set (target viewer plus peer viewers) provides collaborative recommendation input to the combined viewer set. This combined viewer set is a set in which all (or a plurality of) viewers are mutual publishers and subscribers.

To receive recommendations the target viewer joins one or more viewer sets. The viewer set may be an ad hoc collection that is unique for each target viewer, or it may be organized into a collection that is common for all viewers in the set.

Referring to FIG. 4, the three principal viewer set collection types are illustrated. These collection types can be approximately categorized by the anticipated size of the viewer set. However, the actual implementation may result in a continuum of the attributes described for each of the types.

Buddy Roster

A buddy roster viewer set 400 is normally created in an ad hoc fashion. This is where the target viewer joins directly to one or more "friends" or known parties. Generally, this is a small collection of close friends or acquaintances. For a target viewer who is new to the system, the buddy roster viewer set 400 may be the most comfortable type of set to use. Generally, the buddy roster viewer set 400 is private in membership and private in visibility to others outside the target viewer.

Group

A group viewer set 410 may be organized as a common group where many users may join the same group. Commonly, the group viewer set 410 is a medium sized collection of acquaintances that are close friends or have some common interest. Generally, the group viewer set 410 is private in membership and private in visibility to others outside the group viewer set 410.

Community

A community viewer set 420 is organized as a common group where any user may freely join the group. Typically, the community is a large sized collection of distant acquaintances or unfamiliar users that normally have a common interest. Generally, the group is public in membership and public in visibility to everyone.

Mixed Collection

Typically, there will be an evolution in the viewer's adoption of the different viewer sets provided by the system. The viewer will start with one or two buddies in a buddy roster 400, and then expand to join a group 410 or a community 420. Eventually, the viewer may have multiple viewer sets, with different policies (described below), which may have overlapping intersections, and the viewer will be comfortable with them all being active simultaneously.

Policy Details

Viewer sets may have many configuration settings and policies for joining and viewing different sets including:
- Joining the viewer set (membership) may be unrestricted or restricted as defined by the viewer set administrator. (E.g. via pre-defined list, or via a request/approval process.) Viewer sets may be open or closed for new members.
- Viewer set details may be visible or hidden to non-members. For instance, the identity of members and the policies of the viewer set may be visible or hidden. The viewer set may list its set name for other viewers to request admittance to. Alternatively, the viewer set name and all details about the set may be hidden to increase privacy.
- Recommendations generated by members of a viewer set may have some details visible, hidden, or removed. For instance, the sender identity and details about his viewing environment may be visible, hidden, or removed. Anonymous recommendations may have a variable degree of privacy, to allow some personal context information to be visible even if the precise identity is hidden. For instance, the viewer's available content provider services (e.g. cable provider package) may be pertinent to the recommendation processing, and thus be viewable.
- Viewer sets may include default minimum and default publication options. For example, a public community such as the Bay Area Retired Persons Viewer Community may require that all members provide anonymous unedited viewing recommendations to the community at large. This is helpful to inhibit viewers from editing or filtering their viewing data which would skew the collaborative results. These default and minimum publication options can be applied to individual viewers or to viewer sets that are nested into other sets. The policies are generally attributed to organized viewer sets. However, they may be attributed to individuals who utilize a buddy roster type viewer set, instead of an organized viewer set.

Recommendation Characteristics

Figure 5:
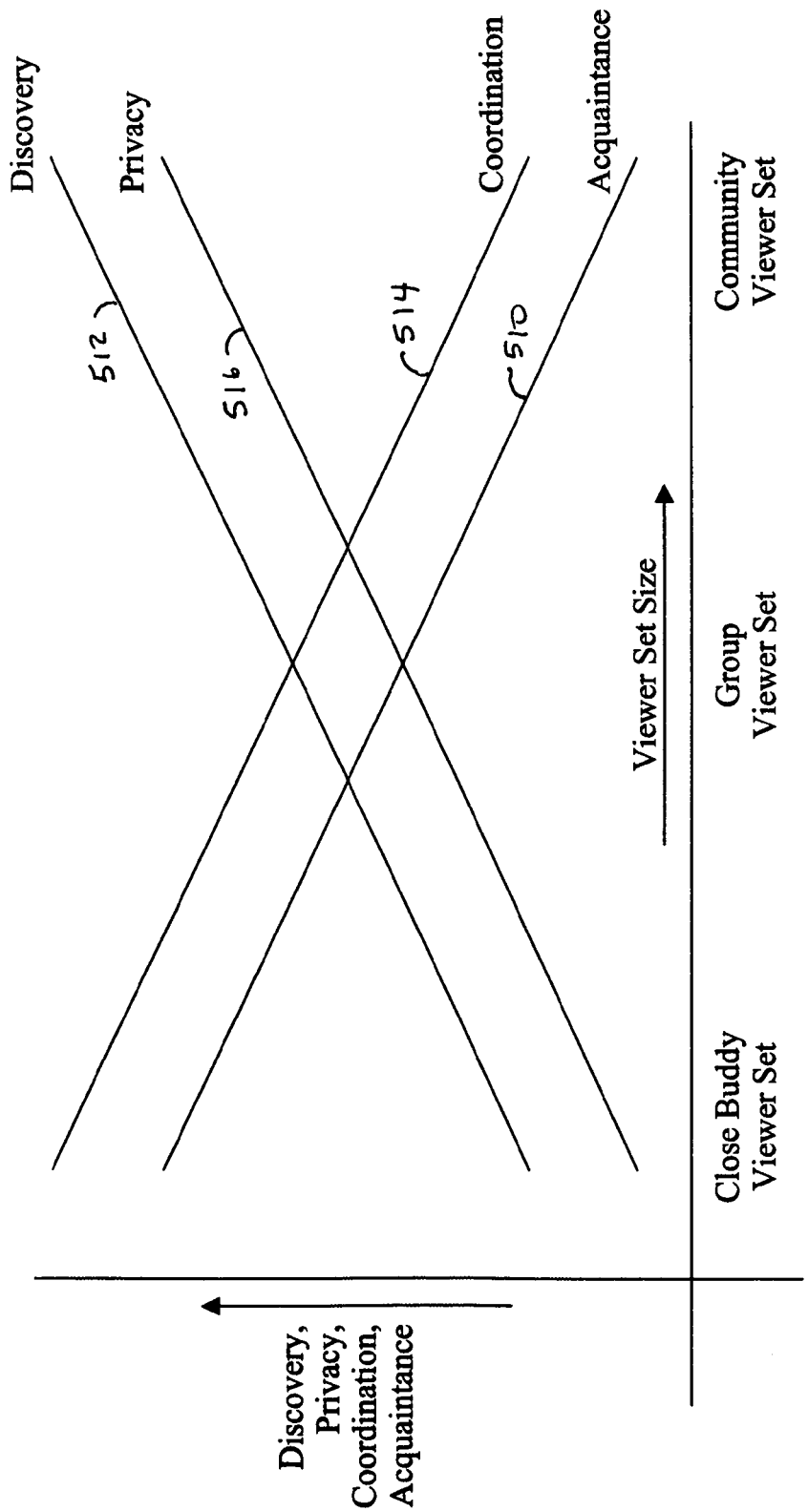
FIG. 5 illustrates viewer set characteristics.

The three principal collection types may be ordered by size of viewer set. Prototypically, these collection types have set characteristics that show trends as depicted in FIG. 5. These characteristics are generally increasing or decreasing as shown. However, this is not a fixed relationship.
- Acquaintance 510 is the degree of familiarity between viewers within the viewer set. Buddy rosters are typically close friends, while large communities tend to be made up of remote acquaintances or even strangers.
- Discovery 512 is the ability for a viewer to receive recommendations that are outside his typical selection preferences. A recommender system that is based solely on a viewer's content selection preferences or on the preferences of his close (similar) friends has less opportunities for discovery. Conversely, a recommender system that includes many viewers of low acquaintance has greater opportunities for discovery.
- Coordination 514 is the ability for viewers to interact with each other. It is also the ability for viewers to manipulate other viewers' environments.
- Privacy 516 is the measure of information and identity hiding. Typically, in a large community, the users would want their identity to be anonymous, and to limit the availability of personal information.

Independent of the viewer set type, viewers of the system may mandate heightened privacy levels until they are more comfortable with the system. This heightened privacy may be the default during initial configuration.

Hierarchy

Viewer sets may be nested, such that the members of one viewer set are joined into another set, thereby forming a hierarchy of viewer sets. This may provide the following benefits.
- The collaborative processors and the user interfaces can blend the recommendations from the parent superset with the child subset. In this way, the nested subset can receive the diversity of recommendations from the parent superset while permitting the relaxed privacy restrictions within the subset. This provides enhanced discovery.
- Other administrative and regional benefits result from the hierarchical viewer sets.

Examples of scenarios in which viewer sets may be nested are described below.
- Nested friends (groups)—A large group of friends may form a broad viewer group and smaller subgroup of closer friends may form within this larger group. For instance, a group of a dozen friends with common interests may form a viewer group, and then two or three best-friends may form a subgroup within.
- Special interest (communities)—A large community of viewers with a common interest may form a semi-open viewer community, and smaller sub-communities may form within this larger community. For instance, the Bay Area Aviators Viewer Group (or Retired Persons, or Historical Society) may be formed. This community may permit and promote sub-communities or chapters to be formed. These sub-communities may even support additional nesting of sub-communities.
- Academic (groups/communities)—A teacher or seminar speaker may form a semi-open group for a particular subject. However, this type of group is probably not useful except where multiple simultaneous viewing choices are applicable to the subject.

Nesting Architecture

Figure 6:
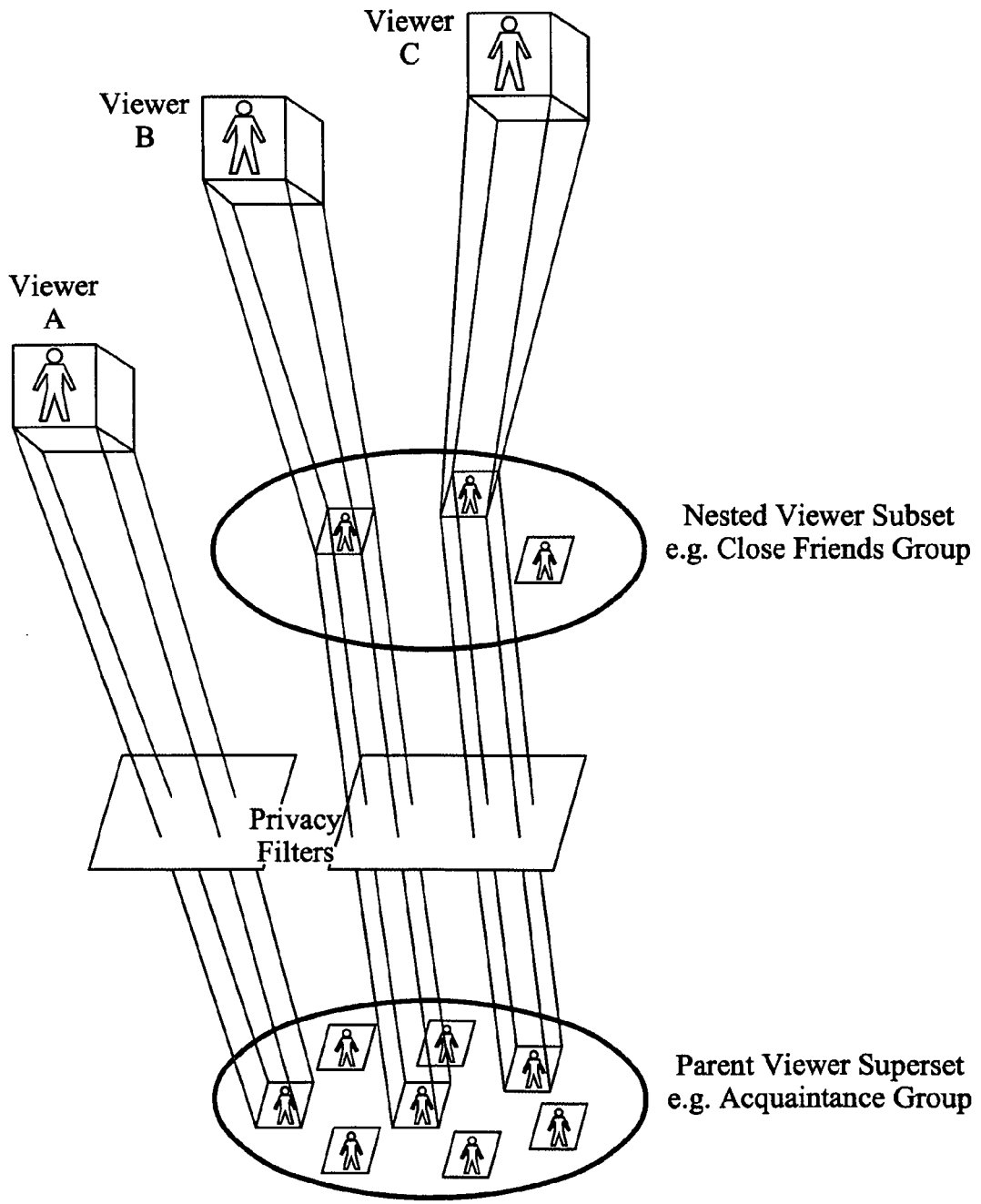
FIG. 6 illustrates nested viewer set members.

The viewer sets may be nested in many ways. For example, each of the members of the nested viewer set may be individually projected into the parent superset, maintaining their individuality. Alternatively, the nested viewer set may be projected en masse into the parent superset, and the nested viewer set becomes a single composite entity in the parent superset.
- Nested Members—Referring to FIG. 6, the individual members may be entered into the parent superset. Viewers B and C are members of the Close Friends Group which is nested into the Acquaintance Group. Viewers A, B and C are projected through the appropriate privacy filters as members of the Acquaintance Group, but viewers B and C are able to share recommendation and interact with the relaxed privacy constraints of the Close Friends Group.

Figure 7:
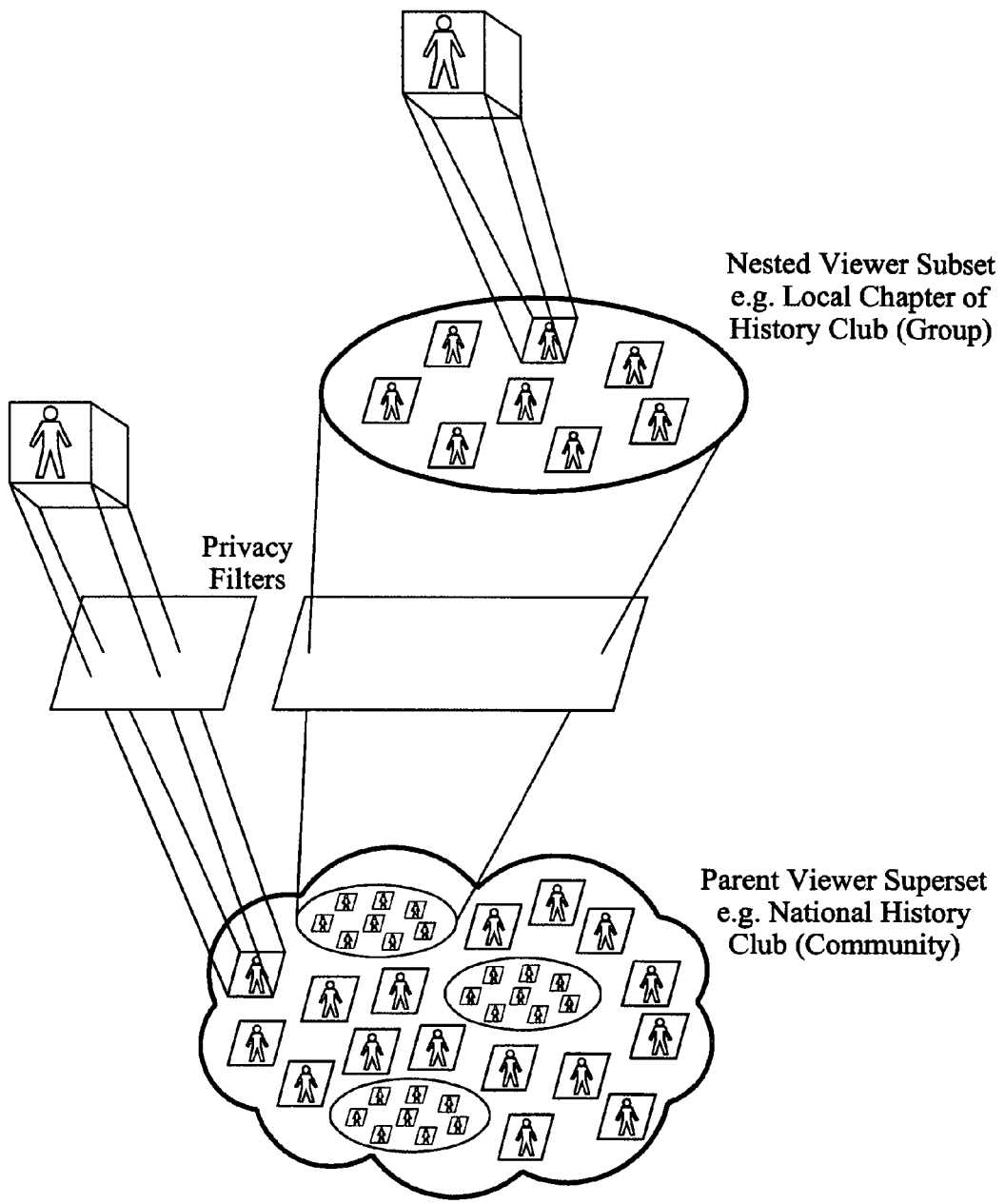
FIG. 7 illustrates nested viewer set single entity.

Nested Sets—Referring to FIG. 7, the nested viewer set may be entered as a single entity into the parent superset. This form of nesting may provide organizational benefits as well as the privacy benefits of the nested members form.

Viewer Profiles

Users of the system may have personal profiles. The system may maintain identification and other presence information. When viewers join organized viewer sets (groups or communities), additional member profile information may be maintained for the user. Viewers that are members of multiple viewer sets may have a profile for each set. All profile information may be classified as visible or hidden to all, to the other members of the viewer set, to the administrator, and even to the target viewer. Some examples of viewer profile information is described below.

- Viewer identity, including name, handle, password, address, e-mail, IP address, etc.
- Home audio and/or video configuration.
- Content provider details.
- Inferred statistical data about the viewer and his recommendations. This may include viewing durations of particular video content, recommendation accept/reject rate, usage history, auto-profiled preferences, search history, etc.
- Configuration settings for processing preferences may be part of the profile, and may be managed at the viewer location and/or they may be managed as part of the viewer set. This may include subscription and publication settings, content preferences, permission/access control lists, etc.

Architecture

The processing nodes for the system, depicted in FIG. 3, can be distributed and combined in several configurations. Two common configurations are peer to peer and client server.

Figure 8:
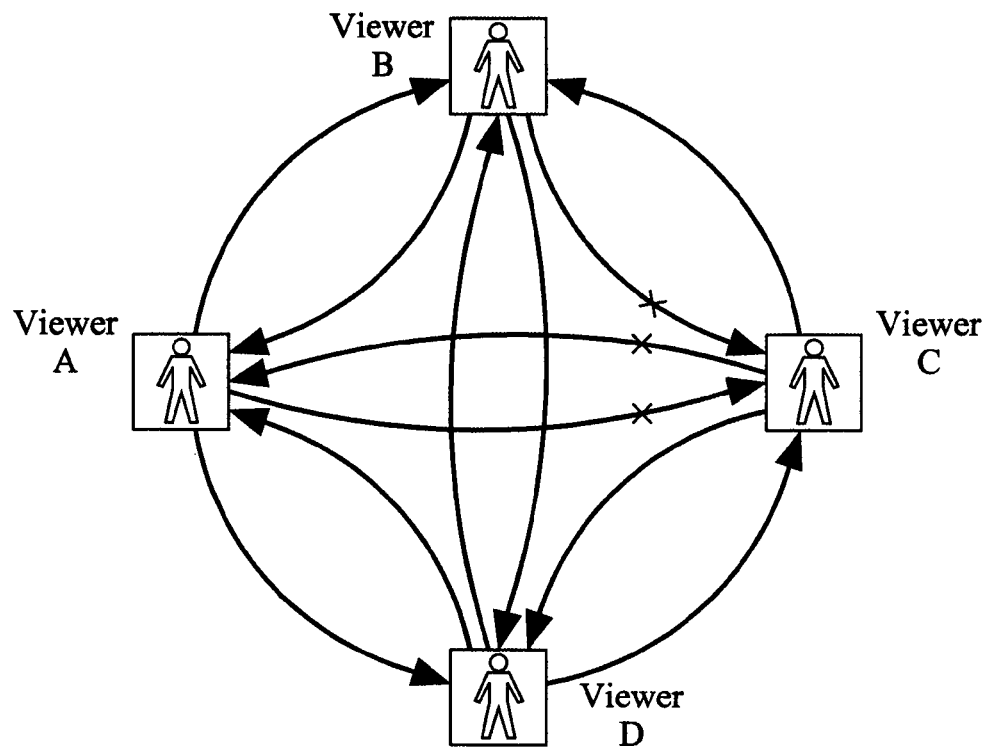
FIG. 8 illustrates peer to peer technology.

In the peer to peer configuration, each viewer is connected directly to the other members in his viewer set, as depicted in FIG. 8. Each connection has an inbound and outbound path, corresponding with the subscribed and published recommendation paths. These two paths are somewhat independent. For instance, viewer C has subscribed only to viewer D for recommendations, but he is publishing to both viewers B and D.

Figure 9:
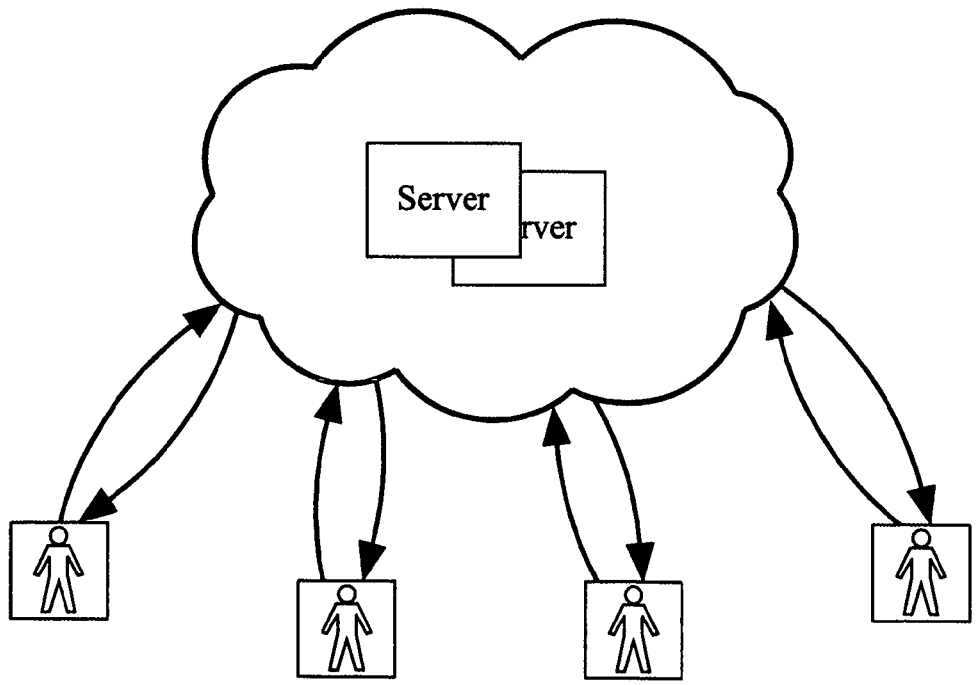
FIG. 9 illustrates client server topology.

In the client server configuration, each viewer is connected to a central or distributed server. This basic configuration is depicted in FIG. 9.

Processor Distribution

The topology of the system determines where the processing nodes should be located. The two common configurations are described below.

Figure 10:
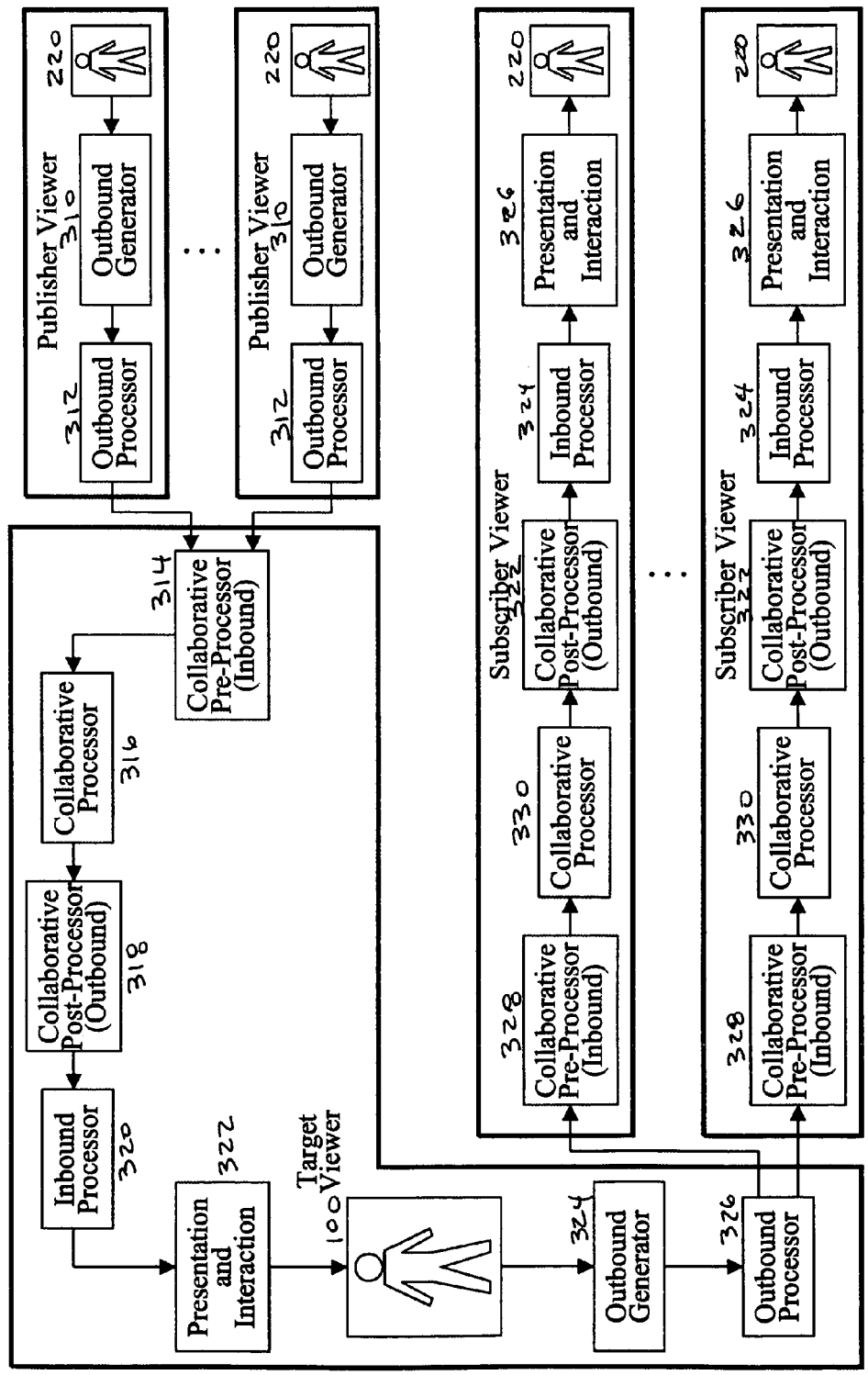
FIG. 10 illustrates peer to peer processor architecture.

The peer to peer topology may result in a processor architecture as depicted in FIG. 10. The collaborative processing is duplicated for each viewer. Inbound processing is expanded to perform the collaborative processing. Outbound processing is relatively light, allowing for a thinner publishing component. (An alternative approach is to expand the outbound processing operations to include the collaborative processing, which would result in a thinner subscribing component.) However, shifting the processing to the inbound or the outbound side doesn't reduce the total viewer processing because both paths are included in a normal viewer.

Figure 11:
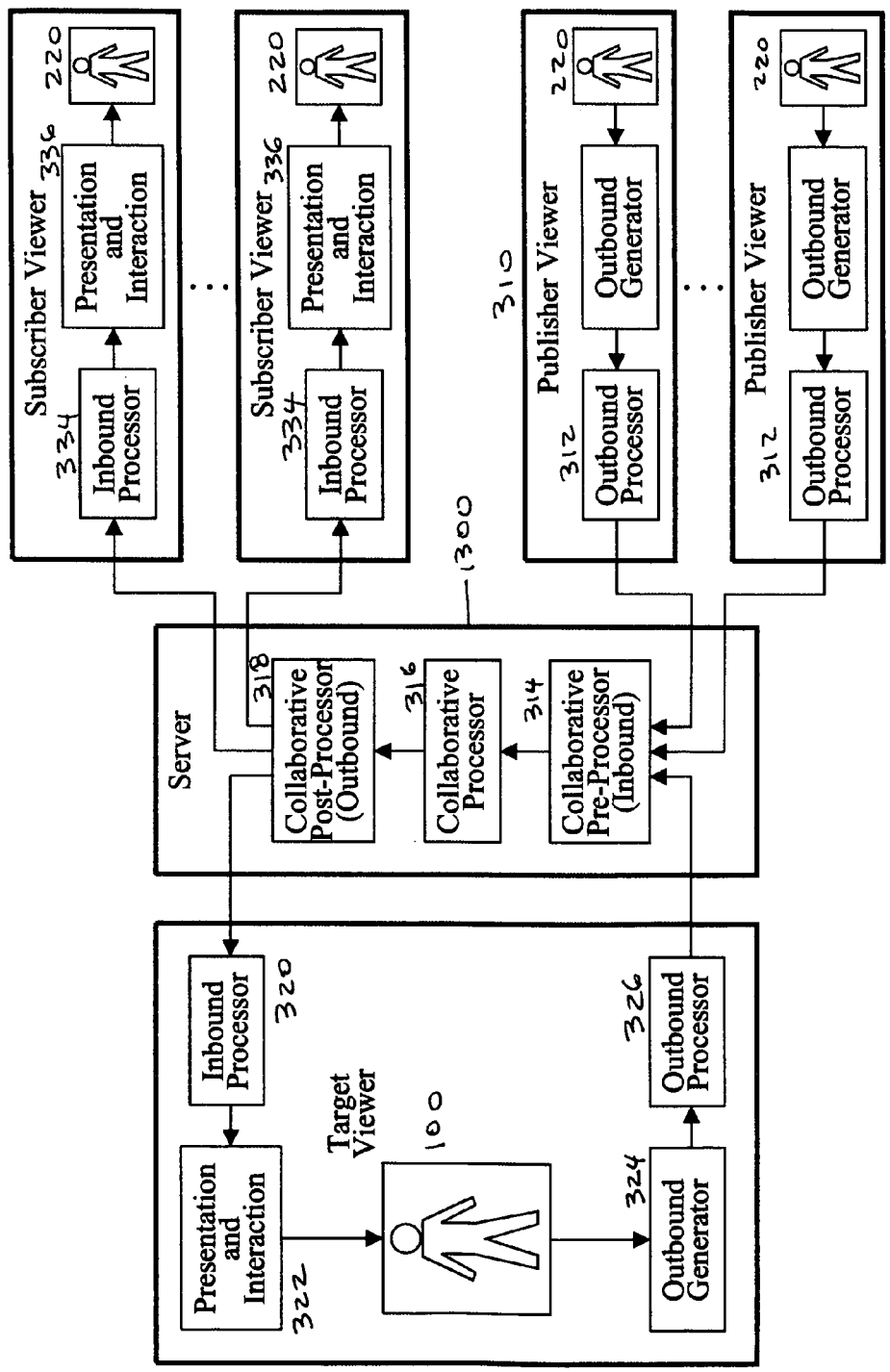
FIG. 11 illustrates client server processor architecture.

The client server topology generally results in a processor architecture as depicted in FIG. 11. The collaborative processing is centralized in the server. Inbound and outbound processing (subscribing and publishing) are thinner because of the centralized collaboration.

Mixed Architecture

Each viewer set should be supported by an architecture, such as peer to peer or client server. However, a viewer may belong to multiple viewer sets which may have different architectures. Even if the multiple viewer sets have the same architecture, they may have different service providers. The result is that the viewer is connected to multiple infrastructures. The seamless combination of multiple infrastructures may require that the viewer component (combined publisher and subscriber) be able to connect to the various infrastructures, and manage the various viewer sets, preferably in a common integrated format.

Processing Sequence

Processing operations may be distributed amongst the processes in a variety of combinations. The table below summarizes the typical assignment.

|  | Outbound Generator | Outbound Processor | Pre-Collab Processor | Collab Processor | Post-Collab Processor | Inbound Processor | Presentation & Interaction |
|---|---|---|---|---|---|---|---|
| Manual/Automatic Generator | X | | | | | | |
| Manual/Automatic Privacy | X | X | | | | | |
| Filter, Edit, Route | | X | | | | | |
| Target Filter Continuity | | X | X | | X | X | |
| Collaborative Filter | | | | X | | | |
| Target Filter Preferences | | | X | | X | X | |
| Target Filter Weighting | | | X | | X | X | |
| Localization | | | X | | X | X | |
| Presentation & Interaction | | | | | | | X |

Recommendation Types

The Outbound Generation Process 310 provides the "raw" recommendation information. This may be automatically inferred from the viewer's content navigation and program selection, or it may be manually generated by explicit user input.

Figure 12:
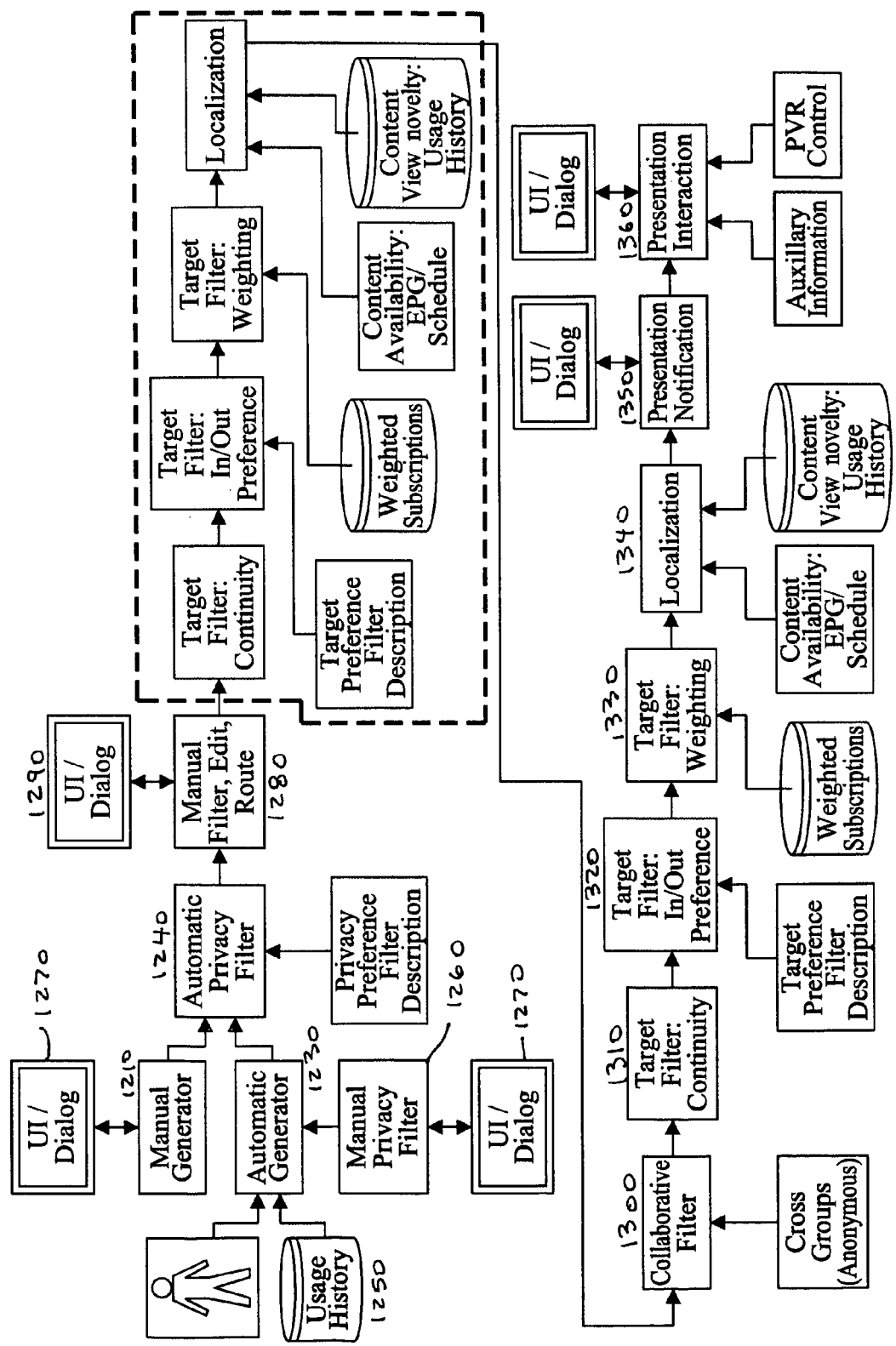
FIG. 12 illustrates processing sequence.

Referring to FIG. 12, the program selection and channel selection recommendation types are forms of more general content selection. Program summary recommendation type is a form that supports content consumption.

Program Selection Recommendations

The publishing viewer generates recommendation information that is used to help the subscribing viewer to make specific program selections. This information may be plain or aggregated program listings, or it may be filter descriptions that ultimately yield program listings.

Currently Viewed Program Selection

The program that the publishing viewer is currently watching is a strong selection recommendation. The outbound generation process 310/312 automatically posts the current program recommendation (through the collaborative processor) to all suitable subscribers. An update recommendation is posted when the program changes. Program changes may occur due to:

Viewer actions such as turning on/off the television or changing channels;
Normal broadcaster change of program;
Local media players reach the end of the program;
Schedulable playback device starts playing a new program.

Commercials and intermissions are preferably not considered program changes. Additional context information (e.g. available content), and filtering (e.g. surfing and privacy) may be provided. The core raw information is the current program being viewed. The currently viewed program selection may be a direct result of a selection chosen from the publishing viewer's content preference filter. In this manner, the publishing viewer's content preference filter is indirectly propagated to the subscribing viewer set.

Unviewed Program Selections

The specific program that the publishing viewer is currently watching may be the strongest program selection recommendation. However, there may be additional programs that the viewer found to be close runners-up when he was searching for his program. These secondary selections may be valuable recommendations to some subscribing viewers.

Using the Manual Generator 1210 the publishing viewer may examine his available content list (possibly through a search list) and he may consider some programs to be good selections, even though he may not choose to watch them presently. In these cases, he can actively denote these programs (within his program selection user interface 1220) for recommendation publication.

During the search process, some programs may turn up which are very similar in metadata description to the final selected program. This determination may be done automatically by the automatic generator 1230, and it may also pass through dedicated selection preference filters 1240. For example the viewer may have generated a search list of several vampire movies. He selects and starts watching one of them without previewing the others. The currently viewed program will be posted as a primary recommendation. The other vampire movie possibilities should optionally be qualified by the secondary recommendation selection preference filters, and then be posted as secondary recommendations.

The publishing viewer may have access to a different recommender source, for instance a suggestion list. The close runner-up programs which are not selected may be posted as secondary recommendations.

The appropriate filter and preference weightings are applied to the secondary recommendation types, to ensure only higher correlated selections are presented.

Usage History

The publishing viewer is consuming content through a device which has content management functionality. Logging of UsageHistory 1250 is a component of content management. There are two primary ways in which the UsageHistory 1250 can be used to generate program selection recommendations.

The outbound generation processor may aggregate the UsageHistory log, and use the detailed user action events to form a compiled program selection recommendation that has a refined preference weighting description.

The user action data is information that does not typically get published to the subscribing viewers. For example, events like pause/resume and rewind/play indicate that the viewer was especially interested in the program. The user's consumption actions may automatically create and refine content preference filters. Similarly, the user's consumption actions, as logged in the UsageHistory table, will create and refine specific program selection recommendations.

The UsageHistory can be used to generate recommendations as a form of catch-up. In the initialization of the system for a publishing viewer, the UsageHistory can be used to upload any recent usage that was missed while unconnected. Alternatively, in the initialization of the system for a subscribing viewer, the UsageHistory can be requested from all publishing viewers, and the downloaded usage information will allow the system to catch-up. This may not necessarily be a form of instantaneous recommendation, and it could be implemented in a system without presence technology functionality.

AD HOC Section Preference

The list of program titles (or other defining descriptors) is a result of the publishing viewer's selection process. Taking it back a step, a subscribing viewer set can share the actual process of selection.

Ad hoc selection preference filtering uses temporary content filters to search for desired content. For instance, if a buddy uses several keywords or genre descriptions to search for programs, these temporary filtering descriptions may be meaningful only at that point in time. The next day, or even later that same evening, these ad hoc descriptions may be abandoned. If they are not abandoned, they may become part of the fixed selection preference filtering descriptions.

Fixed or semi-permanent selection preference filtering descriptions can be shared through offline (non-instantaneous) channels, or they can be managed with the system. However, ad hoc selection preference filtering descriptions should be "instantaneously" shared. The publishing of selection preference filtering descriptions, whether they are ad hoc or fixed, may be done using a standardized description structure, such as MPEG-7's Filtering And Search Preferences description scheme, or TV-Anytime.

Channel Selection

A viewer group may generate a content preference listing for broadcast channels or other content delivery channels. The channel selection may be a coarse or fine recommendation type. A coarse channel selection is accumulated over multiple viewing cycles, while a fine channel selection is an instantaneous notification. (In the extreme case of instantaneous notification, the channel recommendation is essentially another type of descriptor for the currently viewed program selection.) Channel selection recommendations may be dependent on the time of day or week.

Program Summary

The publishing viewer may generate a summarization description for a selected program. The description may include skipping ahead, repeating clips, playing at slow or fast rate, and other browsing operations. The program summarization description is more meaningful for content that can be non-linearly navigated. This may be content that was recorded, time shifted (e.g. TiVO live delayed TV), or that is available in local media. The content may have consistent timestamp or offset information available to permit accurate browsing (transport) control.

The non-linearly navigable content may be available to both the publishing and the subscribing viewers, although it doesn't have to be the same run of the content. For example, the publisher may generate the summary on an early run of the program, and the subscriber may consume it on a later run that he records or time shifts. Summarization descriptions may be automatically generated by monitoring the publishing viewer's actions or by extraction from his UsageHistory log. Alternatively, the descriptions may be generated by a personalized (custom) or third party summarization application.

Figure 13:
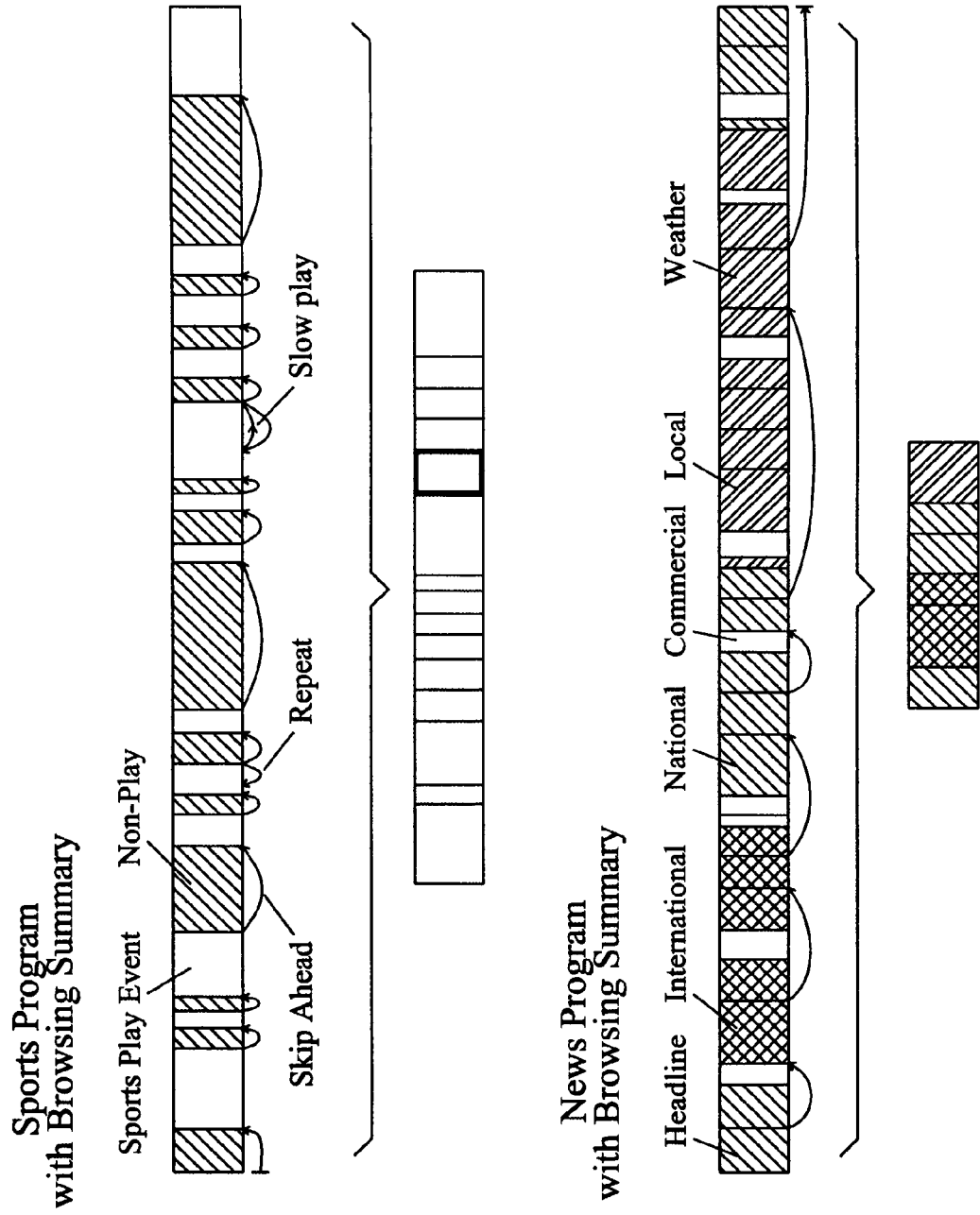
FIG. 13 illustrates summarization scenarios.

Summarization descriptions would be especially useful to, summarize sports programs, or summarize heterogeneous programs (e.g. the news is heterogeneously composed of weather, sports, etc.), or to skip commercials. FIG. 13 depicts sports and news scenarios where summarization may be valuable.

SUMMARY

If the publishing viewer is watching and summarizing a time shifted program, then the subscribing viewer may be able to use the summary immediately if he is also time shifting the program. This is a presence technology based way to watch the program. The viewer has "instantaneous" summary updates which enable him to watch the same summary of the program at the same time as the recommender.

If the subscribing viewer activates the summary for playback on a recorded or local media, then the instantaneous nature of the summary updates may not be utilized in some cases. However, the presence technology is still providing value because it supports a sense of timeliness to the published recommendations and summarization descriptions. As these inputs are received by the viewer's system, he gets an instantaneous notification. This may trigger the viewer to go and view the program and summary, or it may trigger him to reserve it for a future viewing.

While the publishing viewer is watching and navigating the program, he may edit or manually generate summary items. He may also annotate the summary. This may be valuable to special interest groups such as teacher/student or political interest groups.

Published Data Elements

The recommendation types listed above (program selection, channel selection, and program summary) should support the following elements and concepts.

Recommendation item details—uniquely identifying description that is appropriate for the type of recommendation.

Program selection details—details that will enable location of the given program. This may include program title, subtitle, episode, content channel, creation and delivery timepoint, etc.

Content channel details.

Summarization description—summary details (see MPEG-7 schema or TV-Anytime)

Degree of preference—e.g. preference value in MPEG-7 or TV-Anytime. By default, a certain positive degree of preference is assigned or assumed about recommendations, but there will be occasions when a recommendation deserves special preference weighting. For instance:

An especially high preference program may be designated with a higher than normal preference.

An urgent program (e.g. live broadcast) may be designated with a high preference weighting, or a time condition may be inserted (e.g. in the preference condition description of an MPEG-7 message), or some other appropriate indicator may designate urgency.

A negative preference or aversion may be designated by negative preference weighting or similar.

Recommendation source type—description of the publisher's generation source. This may include attributes of primary/secondary, manual/automatic, surfing/EPG/recommender selection, content-preferences/UsageHistory, etc.

Endorser position—description of how the item is currently being consumed by the publisher. This may include the specific timepoints/offsets into the program where the publisher is currently watching the program, etc.

Endorser context—description of the environment from which the publisher is making the recommendation. This may include fixed elements such as the AV setup and the content channels that are available to the viewer. It may also include dynamic elements such as other viewers present and any factors affecting the publishing viewer's attention to the content selection and consumption process.

Annotation—Comments, summary, emphasis, etc. for the recommendation. May be present in various formats e.g. text, audio, graphics, video.

Condition qualifiers—description of time, location, or device conditions for the recommendation (e.g. the preference condition of an MPEG-7 description). For instance, a publisher may designate that a program selection is intended for the family viewing time period.

Or, a publisher may designate that a program summarization description is intended for a portable device

Outbound Processing

The publishing component may further process the outbound recommendation data. This outbound processing includes editing, manually generating, filtering and localizing the recommendation. Some of these may be exclusively tied to the publishing component. The editing operations and the manual generating operations will augment the recommendation information with user input, and so they should remain in the publishing component. The remainder of the outbound processing operations may be performed outside the publishing component. In particular, the filtering and localization operations may be performed in the next processing node, the collaborative pre-processor stage. These relocatable operations are described in this section. The collaborative pre-processor stage is described implicitly by these operations, and that stage is not described further in this document.

Comfort and Trust

The user's comfort level and trust level with the system should determine the degree of automation and the degree of advanced feature availability. Conceptually, a global comfort or expertise level setting may be entered for the user. Based on this setting, some operations should be performed automatically and others may require manual interaction. Similarly, this setting may determine the level of detail or sub operations that are revealed and available to the user. In general, privacy and comfort levels are different forms of trust. Privacy filters are covered later.

However, there is one attribute of privacy that is particularly relevant to the comfort level of the system. The degree of openness and visibility that is offered to the user should be related to the level of comfort. The default user (beginner with low comfort) should only be offered features that feel safe, and advanced users (more comfortable) may be offered more open features. For example, advanced users will feel more comfortable with distributing more personal information, knowing that the server will properly secure this information.

The publishing viewer may choose to mask or filter their outbound recommendations with the manual privacy filter 1260. The user should have the option to manually override and disable recommendation publication with an interface 1270. This may be done for a single program, for a definable period of time, or until further notice.

The user may automatically filter recommendations that meet a pre-defined content criterion, or that occur in a pre-defined environment (e.g. time, location, or device). This automatic privacy filter may be based on a dedicated privacy content preference filter description. All of the publication privacy filters may be customized for each recipient. For instance, the user may automatically or manually filter recommendations for a particular subscribing viewer or subscribing viewer set. This is especially important when the user has multiple viewer sets with varying privacy characteristics.

Privacy Filter

The publishing viewer may be notified of outbound recommendations, which provides him with real feedback about the automatic system outbound processing. After being notified, the publisher may have the opportunity to filter, edit, annotate or route the recommendations at function 1280 with interface 1290. The publisher may filter the recommendation to pass or stop it from being posted. Also, he may optionally stop or post all related postings for the current program. He may edit the preference weighting or other fields of the recommendation. The publisher may annotate the recommendation with text or voice comments. The publisher may be able to route the recommendation by designating the target subscribers who should receive it. All of the outbound processing for annotation and amendment may be customized for each subscribing viewer or subscribing viewer set. For instance, the user may choose to disable manual notification and amendment for a subscribed anonymous community, but enable it for a small familiar group.

Annotation

The publishing viewer may manually generate recommendations. During the selection process, the publisher may encounter programs that he doesn't select for himself, but that he wishes to publish as a recommendation to some subscribing viewers. For instance, "I think that Terry would like to see this program, even though I am not watching it." While consuming a selection, the publisher may wish to publish the current program selection recommendation to a viewer that might otherwise not receive the recommendation.

The publisher may publish the unsolicited recommendation to a viewer or viewer set that is not currently subscribed, but which has granted the publisher unsolicited publication privileges. Unsolicited publication privileges are an enhanced access right that a system may offer to it members. Basically, the system provides a means for exceptional recommendations to be posted to the users, even when they are not watching TV or are not engaged in the system in the regular way. For instance, the system may post a text message of the given recommendation to a user that has presence status "online". The publisher may post the recommendation to a subscribing viewer that is currently disabled or for whom the publisher has privacy filters to normally block outbound recommendation. Basically, the publisher temporarily overrides his own outbound privacy filters.

Target Filter

In some processing sequence alternatives, the outbound processing path may assume some or all of the target processing operations. For instance, a peer to peer system with thin subscriber component will tend to put the collaborative and target processing into the publishing component. Target processing includes filtering by continuity, selection preference and subscription weighting. It also includes localization by content availability and viewing novelty.

Publication Settings

A viewer set may have default, minimum and maximum publication configuration settings. This may be set up by the viewer set administrator, and it is more likely to be used in a public community where there are a large number of unfamiliar members. Publication configuration settings may include any of the processing configuration settings described in this section, plus the settings for the outbound generator node. For example, the Bay Area Historical Viewers Community may have a minimum publication requirement that requires all members provide their unedited, unannotated, anonymous viewing recommendations (while joined in).

Collaborative Processing

The collaborative processing node 1300 is generally the point where publisher recommendation inputs are aggregated into viewer set recommendations. Then these viewer set recommendations are distributed to the recommendation subscriber targets. The collaborative processing may be performed in the server, publishing clients, subscriber client, or a combination of these. (Some of the approaches described herein may require a centralized collaborative processor, but some can be distributed.)

Conventional collaborative filtering is the method of making automatic predictions (filtering) about the interests of a user by collecting taste information from many users (collaborating). This differs from the more simple approach of giving an average (non-specific) score for each item of interest, for example based on its number of votes. Relying on a scoring system which is averaged across all users ignores specific demands of a user, and is particularly poor where there is large variation in interest.

In potential systems there are scenarios with small variation in interest and there are scenarios with large variation in interest. The system may aggregate inputs in the collaborative processor to handle both kinds of scenarios.

Pass Through

In buddy rosters and in close/familiar groups, there is typically a small variation in interest amongst the members. The members are assumed to already be clustered as a collection with similar viewing interests. For these kinds of systems, the most appropriate collaboration may be the straightforward scoring system averaged across all members.

In large viewer sets, the collaboration processor and/or the presentation processor may have to average the input recommendations to prepare a more manageable recommendation notice to the subscribing viewer.

In small viewer sets, the collaboration may not even average the input recommendations. In these minimal systems, the collaborative processor may pass each recommendation, with publisher identification, through to the subscribing viewers.

Community Collaboration

In unfamiliar groups and communities, there is typically a large variation in interest amongst the members. In hierarchical communities, there may be larger variation. Full featured service providers (e.g. AOL-like service) may provide the opportunity for a viewer or viewer set to subscribe to anonymous cross-group recommendation viewer set collections. In this scenario, unrelated groups or communities may pool their recommendations. These non-peer recommendations may be considered "supplementary", "cross-group" or "world" recommendation sources. These unrelated cross-group viewer set combinations should have high variation in interest. For all these kinds of systems, conventional collaborative filtering algorithms may be appropriate. Indices about the interests of the viewers and viewer sets may be extracted, and then predictions about the interest of the member viewers and viewer sets can be generated. The members may be considered the individual viewers, or they may be the joined/hierarchical viewer sets or they may be some combination of these. The interest indices can be generated directly from the content preference filter descriptions if they are managed by the system. If these are not available, then the viewing UsageHistory for the members may be logged and examined to generate interest indices.

The collaborative filtering algorithms used in the system may be based on a correlation coefficient which may be used to determine the relationship between different viewer's (or viewer sets') viewing preferences. Alternative collaborative filtering algorithms may be used.

Statistical Aggregation

The methods described above (simple average, pass through, and community collaboration) may be configured with alternative statistical emphasis to produce different viewer set recommendations. Generally the collaborative processor should tend to make recommendations that are most similar in interest to the target subscribing viewers. The community collaborative algorithms use a combination of interest indices (preference filters) and publishing viewer endorsement (number of votes) to find the most similar selections. However, in many cases, the viewer set is assumed to be a collection of members with similar viewing interests, and all published inputs are expected to be similar in interest. In these cases, the average recommendation or the one with the highest score may be considered main stream or typical for the viewer set.

There may even be a preference for atypical (outlier) programs that are viewed by very few members. This alternative statistical emphasis may be an inverted normal distribution of the published input endorsements. For instance, in addition to the collaborative statement "Most of your friends are watching program ABC", the system may produce the statement "One of your friends has been watching program DEF, which no one else has watched yet".

Collaborative Input

Collaborative processors which aggregate recommendations into ranked listings may also take into account the context for each publishing viewer's input. The context influences the publishing viewer's selection process, so it may also influence the collaborative process. The publisher context includes fixed elements such as the audio/video setup and the available content channels, plus dynamic elements such as other viewers present and any factors affecting the publishing viewer's attention to the content selection and consumption process. The available content channels (or the available content program listing) may be incorporated in the collaborative process.

Figure 14:
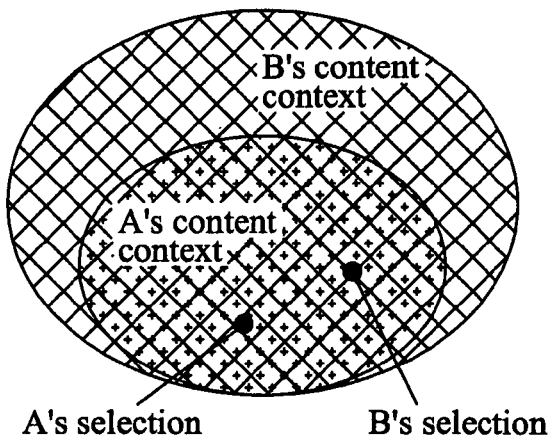
FIG. 14 illustrates content context collaboration input.

One possible approach to incorporate this type of context is to increase the weighting of selections that are made from publishers with a broader available content context. FIG. 14 depicts two publishing viewers with different available content contexts. The selection recommendation from viewer B is weighted slightly higher than viewer A's, because he has a broader set of choices.

Figure 15:
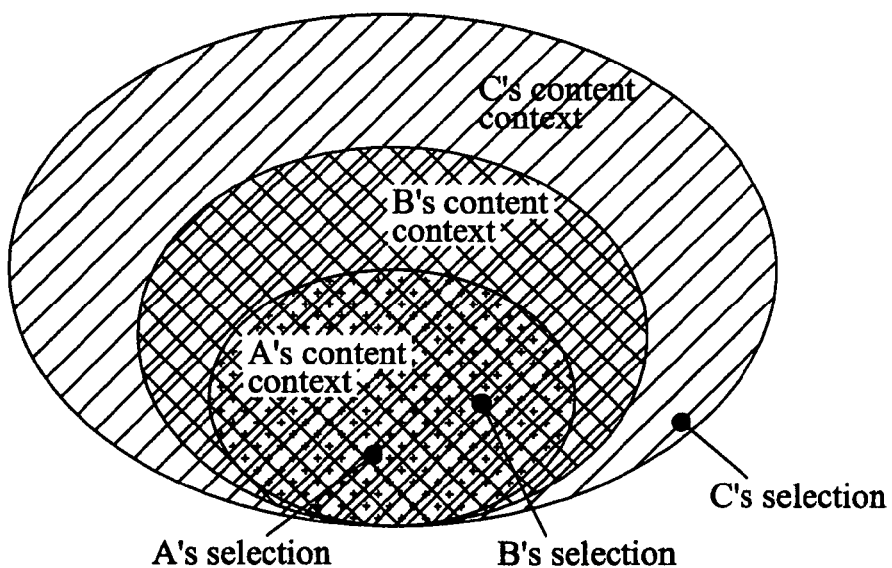
FIG. 15 illustrates content context collaborative input.

A refinement to the approach above is to only adjust the selection weighting when a particular recommendation input is not available to all publishing viewers. In FIG. 15 A's and B's selection recommendations are weighted equally because they are available to all publishers. However viewer C's selection recommendation is weighted slightly higher than A's and B's because he made this choice after considering all of A's and B's content options plus the additional content choices he has. In the approach depicted in FIG. 15 it may distribute a ranked listing of recommendations, because there may likely be a number of recommendations that are unavailable to some of the subscribing viewers.

The collaborative processor may accumulate the inbound recommendations over time. This technique enables the processor to build a composite recommendation listing that is refined in the temporal and collaborative dimensions. The composite listing benefits from the strengths of the instantaneous recommendation processing, plus the strengths of the additional processing dimension for accumulating over time. Accumulation may be done before collaboration (outbound processor or pre-collaborative processor), after collaboration (post-collaborative processor or inbound processor), at some intermediate processing point within the collaborative process, or at some combination of these.

Accumulated recommendation listings are normally available to the subscriber at any time, regardless of the activity of the publishing viewer set (e.g. if the subscriber is the only one watching TV). Typically, the subscriber might access or schedule the accumulated listing to be presented at a regular time. For instance, the subscriber may use the accumulated listing every Friday night, to see what content recommendations have become noteworthy over the preceding week.

The subscriber's Friends Recommend listing and other list-type displays may contain an addendum or side column of the accumulated recommendations. These list displays may also merge the accumulated recommendations with some appropriate designation for accumulated status. The accumulated recommendation listing is a dynamic (living) collection that is actively updated by the system according to some appropriate update mechanism. The subscriber list-type displays (e.g. Friends Recommend) may be updated instantly, as the accumulated recommendation listing changes.

Inbound Processing

The subscribing component may further process the inbound recommendation data. This inbound processing includes filtering and localizing the recommendation. There are a number of sub processing steps that may be used for filtering and localizing. These operations may be co-located or they may be distributed over the subscribing inbound processor, the collaborative post-processor, the collaborative pre-processor, or even the publishing outbound processor. Generally, these operations are associated specifically with the subscribing viewer, so they are described in this section. The collaborative post-processor stage is described implicitly by these operations, and that stage is not described further in this document.

Out-of-Preference Threshold

Figure 16:
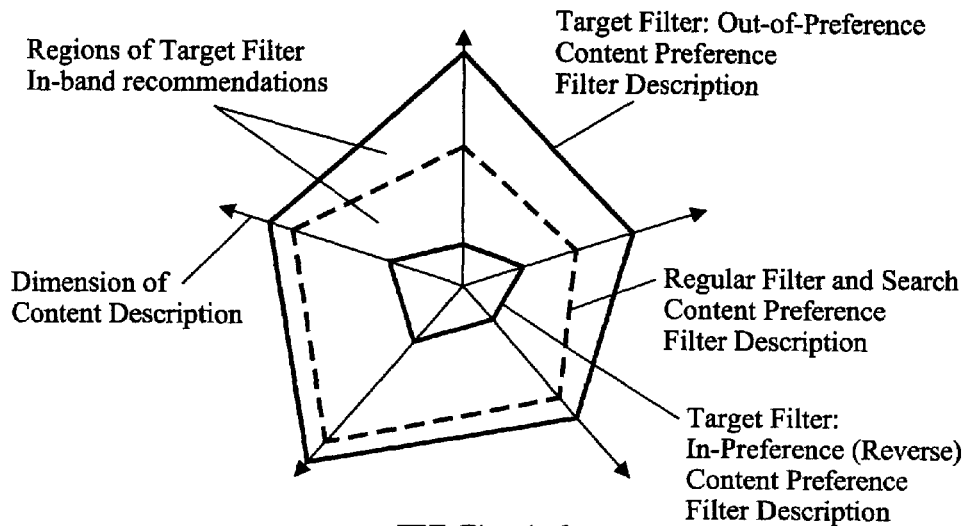
FIG. 16 illustrates an out/in preference filter description.

The inbound recommendation data is filtered to remove unwanted items. The filters are based on configuration preferences defined for the target (subscribing) viewer. Inbound recommendation data may be filtered to insure it is within a desired criteria. The target subscribing viewer may use his regular content preference filters or a specialized inbound content preference filter 1320. As with most preference filter descriptions, an appropriate time, location and device condition set may be used to qualify the use of the preference filter. (In MPEG-7 and TV-Anytime, this is the preference condition description scheme.) FIG. 16 depicts a set of content filter descriptions for a system that uses dedicated out-of-preference and in-preference descriptions.

If the subscribing viewer's content management system has a technique of determining disinterest/non-preference for a program (e.g. "thumbs-down"), the preference out-of-filter description (regular or specialized) may be dynamically updated to reflect these non-preferred items as they are graded by the subscriber.

The out-of-preference filtering process may use the degree of preference for the recommendation, the degree of preference match (or mismatch) to the criteria, and the out-of-preference threshold. This will reduce undesired programs but still allow some marginal cases to be passed. For example, it might permit a strong recommendation for opera, even if your preferences show a slight rejection for that category). Programs that are not removed may have their recommendation preference value modified or augmented with the degree of preference match.

In Preference Reverse Threshold

Inbound recommendation data is filtered to remove readily apparent program selections. The target subscribing viewer may use his regular content preference filters or a specialized inbound content preference filter (separate from the out-of-preference specialized filter above). The filtering process may use the degree of preference for the recommendation, the degree of preference match to the criteria, and the in-preference reverse threshold. Programs that are not removed may have their recommendation preference value modified or augmented with the degree of preference match.

Program Continuity

Inbound recommendation data is filtered to remove short duration recommendations at process 1310. This is especially important to filter out channel surfing. A minimum duration threshold (e.g., temporal) is used to remove or hold back recommendations. If the implementation uses change of program messages to publish the raw recommendation data, then this filter may hold back the recommendation for the defined duration, and pass it through once the period has elapsed. If a new program change is posted before the period elapses, then the old message is deleted and the timer is reset. There may be a publishing program continuity threshold as well as a subscribing program continuity threshold. The publishing filter will use a minimal threshold to help reduce change of program message traffic. The subscribing filter will refine and expand the continuity threshold to meet the subscribing viewer's needs.

Various continuity threshold values may be applied at the subscribing viewer to suit the viewing mode of the subscriber. For instance, a long duration threshold may be used when the viewer is immersed in a program, but a short duration threshold may be used when he is looking at a "Friends Are Watching . . . " type of user interface.

Publisher Weighting

Inbound recommendation data is modified to reflect the subscriber's weighting of the specific publisher. For instance, "John's recommendations are more pertinent than Jerry's". The subscriber inbound processor maintains a database of one or more publishers with associated publisher weightings at process 1330. This value is applied (e.g. multiplied) to inbound recommendation preference values from the given publishers. A default weighting (e.g. 1.0) is applied to inbound recommendations from publishers that are not in the database. The publisher weighting database may also be a simple inbound permission filter. It can filter out specific publishing viewer recommendations. The underlying presence infrastructure may support blocking (e.g. not connecting to) individual publishing viewers. However, in an organized viewer set (group or community) the subscriber does not connect to individual publishers, so he preferably does not set permissions for individual inbound recommendations. The publisher weightings may be applied anywhere in the processing stream where this database is available. The publisher weightings may be applied for a viewer set rather than for a specific subscriber. In this case, the weightings should be applied before the collaborative processing.

Localized Recommendation

Localization 1340 inserts the inbound recommendation into the context of the subscribing viewer. The inbound recommendations may be processed to assemble them with associated electronic programming guide, local scheduling, and/or UsageHistory, to build the localized/personalized recommendation. Typically, the localization is done in the subscribing component, where the context is available. However, if the server or other module is aware of the subscriber's context, then it may perform this processing.

Content Availability

The inbound recommendations are filtered to remove items that are unavailable to the subscribing viewer. Alternatively, the items may be denoted as unviewable for the subscriber user interface (e.g. in the "Friends Are Watching . . . " user interface). The listing of locally available content is maintained by the content management system. This may include electronic program guide (or other scheduling service) personal video recorder, and local media recording servers, Internet content provider guides, and other stored content guides. Programs that may be available on a pay-per-view or on-demand basis may be designated as conditionally available. Programs that are not presently available, but will be available at a later time may be designated with upcoming availability. Programs that are not immediately available may be postponed, or may have an attribute of reduced urgency applied to them. Reduced urgency items would generally not be displayed to the viewer unless they are actively navigating the recommendations user interface.

Content Novelty

The inbound recommendations are filtered to remove items that are currently, recently or previously viewed. Alternatively, the items may be denoted as currently/previously viewed for the subscriber user interface (e.g. in the "Friends Are Watching . . . " user interface.) The UsageHistory log contains details about viewed programs. If the inbound recommendation is one of a program series or other related program collection, then the content novelty processor may check for both the specific recommended episode/instance of the program as well as the containing series/collection. Program episodes that have not been previously viewed but whose containing series/collection has been previously viewed may be denoted as series previously viewed. If the inbound recommendation input has a timestamp or other program offset to indicate which point within the program is being recommended, then the novelty of the program may be determined at the sub-program level. In this case, the content novelty process may use the browsing details from the UsageHistory log to determine if the viewer has viewed the recommended portion. So, even if the viewer has watched a different portion of the program, making that portion non-novel, there may still be a novel portion of the program that should be recommended to the subscriber.

Presentation

The presentation 1350 and interaction processes 1360 make up the extended user interface. This includes the preparation, display, and interaction of the recommendations.

The inbound subscribed recommendation should support the source data elements and it should also support the following elements and concepts.

Recommendation available—status indication for the recommendation. Typically this invokes the initial notification to the subscribing viewer.

Endorsement—description of how the item is recommended. This may include a list or count of recommending entities, a description of the accumulated or instantaneous nature of the recommendation and/or the degree of preference.

Data Elements

The inbound degree of preference may be a composite or individual listing of the degrees of preference for all endorsing publishers. Endorsements may be negative, as depicted by a negative degree of preference. The negative recommendation, especially one for a program that the publisher has watched for a lengthy amount of time, is an important input to the subscribing viewer set. If the publisher considers the program selection to have been a poor choice or a mistake, then it is also likely that the peers of the publisher would make the same selection mistake and would want to be alerted to the potential poor choice. Special handling may be provided for negative endorsements.

A negative endorsement for a program that several members of a viewer set are watching may result in an immediate alert to all those watching it. This may help the viewers to more quickly decide to exit an undesirable program.

Special icons may be used to designate negative preference wherever recommendations are displayed (e.g. the "Friends Recommend" display).

Endorser status—description of how the item is currently being consumed by the recommending entities. This may include indication that viewers are currently watching or have stopped watching.

Endorser supplementary data available—description of data and services that may be available from the recommending entities. This may include simultaneous conversation communication sessions for this selection, or active browser remote controller, etc.

Program supplementary data available—description of data and services that may be available for the specified program selection. This may include summarization description, alternative content delivery methods, commercial recommendations and links.

Display

Recommendations are displayed to the user in a variety of ways. Conceptually, these may be different types of on-screen displays or dialog boxes.

Notification

Notification that recommendations are available should be the earliest and lightest display. Notification display should be tailored to the viewing mode of the user. A different strategy and condition threshold should be used when the viewer is immersed in a program versus when he is actively navigating some control functions. Also, notification display should be configurable to adjust the type, urgency, threshold, etc.

Notification may be performed immediately by a momentary icon displayed on the screen, or an audible beep, or by other unobtrusive method. Notifications may be accumulated for less frequent interruptions. For instance, recommendations may be collected for a period of time or for a minimum count threshold, and then a notification may be rendered to the viewer. Notifications may be accumulated and delayed until triggered by viewer interaction. For instance, when the viewer accesses any control functionality, a notification of available recommendations may be rendered.

The complete recommendation detail listing may be displayed when the viewer purposefully chooses to examine all the details. This may contain all the published data elements or the inbound subscribed data elements. This display view is typically not the first view offered for a recommendation, rather, it is offered as a secondary option available in most of the other display views listed below.

Attached to Guide

Recommendation data is an extension to any program guide or other scheduling guide. Each program listing that has associated recommendations available should display an available recommendations indicator with the listing. For instance, an icon or special character can be displayed on the line for the program. Other data elements may optionally be displayed directly in the program listing, including the degree of endorsement, the availability of supplementary data, etc. Finer details for the recommendation should be accessible by selecting an option on the program listing, which brings up the recommendation detail listing display.

Friends

This display view lists all the recommendations that are targeted and applicable to the subscribing viewer. This should be a complete listing of all the valid recommendations in the subscriber's system. It should only list these valid recommendations, and exclude other available programs (that are not recommended) and other invalid recommendations (that are not available).

The Friends Recommend listing may be organized by the publishers (friends) or it may be listed by the recommendations. (The user may have the option to alternate between these two ordering schemes.) The detail that is offered in this display view may be a combination of program description and endorsement details. Finer details about the program may be available through extended program detail listings (i.e. display options offered natively by the device) and finer details about the recommendation may be available through the recommendation detail listing display.

This display view lists the current viewing selections of all participating publishing viewers. This listing should be different than the Friends Recommend listing because it includes invalid recommendations (that are not available), and it may include surfing program selections. Also, it should exclude old recommendations and program selections which are not currently being watched. This should be an instantaneous picture of what everyone in the viewer set is watching. Because of its instantaneous nature, target filtering and localization processing should be bypassed for this view.

Program selection listings that are invalid should be denoted with an appropriate emphasis in the display. For instance, a publisher's selection that is invalid due to the continuity filter may have an icon of a surfer on the same line. This concept of a surfing indication is analogous to the typing indicator in AOL Instant Messaging. The Friends Are Watching listing may be organized by the publishers (friends) or it may be listed by the current program selections. (The user may have the option to alternate between these two ordering schemes.)

Quick Pick

The sorted recommendation list or a subset of the most preferred entries of this list may be displayed in a quick pick listing. This may be an exclusive listing that is tied to a dedicated control button, or the listing may be combined with the "Favorite Channels" listing that is already maintained on the device. Preferably, the FAVORITE control button or similar would display the predefined list of favorite channels, and appended or inserted in the list are the several most preferred programs from the recommendation list. The combined listing is a circular queue which the viewer may scroll up or down, and wrap around. The listing should be limited to a number of channels/programs that can be displayed on one screen.

In addition, the recommendations may be displayed in suitable on-screen notification. The recommendations may be attached to program guides, where a portion of the program guide indicates the recommendation. The portion of the program guide indicating the video may include an indication that the particular video is recommended, and also the level of recommendation (e.g., from low to high). Other presentation techniques may likewise be used, such as for example, displayed in recommendation based listings, displayed in persistent listings, displayed in full-detail listing, and attached to browser control displays.

The inserted recommendation may be displayed with program description information, or it may be displayed as just the content channel index/mnemonic. If it is displayed similar to the favorite channels format, then it should be augmented with some emphasis (e.g. icon, text note) to indicate the channel is carrying a recommended program selection.

Persistence

A dedicated region of the screen may show persistent listing of the Friends Recommend or Friends Are Watching display views. The data in the display would be instantly updated as the recommendation list changes. The listing may be organized by the publishers (friends) or by the recommendations. If it is organized by the publishers, it may be modeled after presence status displays by showing all members with their current status. The display region may overlay the current program or it may occupy a side/top/bottom bar region. The bar region may overwrite the current program or it may compress the video to fit in the reduced display area.

Browsing

Onscreen browsing controls may be augmented with recommendation information. In particular, the current viewing timepoints/offsets of the endorsing viewers may be superimposed onto the browsing control display. The current viewing timepoints/offsets of endorsing viewers are a part of the endorser position data in the recommendation listing. This data should be updated instantaneously as the publishing viewers browse within this program.

Others

Outbound recommendations may be displayed for editing, routing, confirmation, and information purposes. Generally, there may be a series of recommendation messages associated with any change in the content consumption. This will include program changes, program selection stabilization, browsing operations, and other navigation functions. A persistent onscreen display can depict the status and other details of the outbound recommendation stream. Major changes in the recommendation messages (e.g. change of program, stabilized program selection) may trigger an onscreen dialog or an optionally selectable menu for examining and editing the data. Recommendations may also be initiated and edited directly from the control menus, which allows the viewer to manually generate recommendations for the system.

Action

Within the context of the various recommendation display views, the user may have several types of interactions available.

Further info—The viewer can probe for further details or a different view of the recommendation data. For instance, the viewer may receive an onscreen notification that recommendations are available, which may cause him to navigate through a control menu to retrieve the Friends Recommend listing and then dig deeper to a Recommendation Detail listing.

Instant select—Within any of the recommendation listings, the viewer may select a listing and then choose the instant select control action (e.g. the play button) to switch to that content channel or recorded media source.

Defer action—The viewer may decide to postpone the recommendation for future viewing. A control option may be displayed to indicate that the content is recorded, can be recorded, or is available in a future broadcast run. This allows the viewer to quickly accept and react to a recommendation, without having to completely stop what he is doing.

Enable service—The viewer can act upon supplementary control options that may be available. If a summarization description is available or a browsing remote control session is active for the given program, then the viewer can select the appropriate option to pass control to the supplementary control item.

User Interface

The user interface can be implemented in many ways that are appropriate and differentiating for the application. This section describes some concepts that are relevant to the user interface implementation.

Each presentation item may be considered solicited (e.g. menu or control button initiated) or unsolicited (e.g. popup alert). Some of the items may be configured with a degree of this characteristic. For instance, notifications can be completely unsolicited and immediate by using popup alerts, which provides the best degree of alert. Alternatively, notifications can be completely solicited by embedding in menus, which provides the best degree of unobtrusiveness. Preferably, the configuration allows an appropriate alert/unobtrusiveness level setting that will make notifications be a combination of the two extremes, which provides an intermediate degree of alert and unobtrusiveness.

Presentation items may have a degree of occlusion. Onscreen displays that overlay or compress the video will occlude or reduce the visibility of the program.

Presentation items which list multiple pieces of information may have a degree of information detail. Generally, it is better to minimize the information displayed to simplify use of the system (and reduce the degree of occlusion).

Audible presentation may include tones, beeps, voice synthesis, etc.

Graphical presentation may include icons, text, tables, roster lists, scrolling text, video, images, etc.

Remote Control

The presence technology infrastructure provides the basis for sharing informational messages that support the system recommendations. This infrastructure can also support control type messages that can be used to coordinate operations on remote viewers' devices. One leader or moderator may control several other subscribing viewers' devices. Alternatively, several publishing viewers or the whole viewing set may collaboratively control the subscribing viewers' devices.

The subscribing viewer can elect to let his device's program selection be controlled by one individual publisher or the publishing viewer set's collaborative recommendation. Effectively, the subscriber links their tuner selection control to the network. This remote control provides immediate actions on the subscribing device, for currently available broadcast or mutually recorded content.

The subscribing viewer can configure their device to record program selections from the viewer set. The subscriber may want the device to automatically record program recommendations from the viewer set. The viewer set is building the suggestion list on this individual subscriber's local machine. If the viewer is out of town or not watching TV, the viewer set will prepare his content so that he may get up to date when he returns.

The capture remote control is that the device may include an entity presence that is separate and unique from the viewer's presence. This distinction is important when the viewer and the device are not actually operating on the same content. For instance, if the viewer is not watching TV, or if the viewer is watching content while the device is scheduling/recording different content. Presence for the device should have a similar meaning as for the human viewer. Status should indicate if the device is online or offline. Publishing input should indicate what the device is recording or changes in its recording schedule.

The remote control may simply schedule to record inbound program recommendations that meet a predefined criteria. For instance, programs with a preference match value exceeding a given threshold would be scheduled. The remote control may have more sophisticated conditions for accepting the inbound recommendations such as a minimum number or publishing recommenders, or a specialized content preference filter description. The remote control may have configuration settings that handle recording space restrictions. For instance, recording is only enabled when there is available space or when the first-to-delete (lowest priority) program is non-sports and the recommendation is for a sports program.

The remote control may be performed with a separate collaborative process that is performed by the publishing device presence entities. The involved devices may interact directly, or a central collaborative processor may coordinate the decision. Preferably, the collaboration processor would calculate some index of mutual preference. The mutual preference index would tend to favor maximizing the occurrences of devices recording the same content, but allows for individuals or clusters of individuals to record different programs according to the associated viewer's content preference filters. For example, several baseball fans may link their devices in capture remote control. During the middle of the night when the viewers are not watching or scheduling content, multiple foreign baseball games become available from their content providers. The devices will cast their recording recommendations. If there are conflicts which prevent recording some of the recommended games, then the collaborative process will select the non-conflicting program sequence with maximum mutual preference index. By prior agreement, all the devices schedule this program sequence for recording. The following day, the baseball fans will have a common set of baseball games which they may consume for mutual discussion, or preferably, co-view with supplementary conversational communication and shared device browsing remote control.

The subscribing viewer can configure their browsing (transport) to be under the remote control of the system. Skipping ahead, repeating clips, playing at slow or fast rate and other browsing operations may be controlled remotely. Remote program selection may also be part of remote browsing control.

The controlling entity is generally a designated publishing viewer. Effectively, the controller's browsing control actions are broadcast to the subscribing viewers. Alternatively, the controlling entity could be a previously generated program summarization description which the subscribing viewers agree to consume simultaneously. (If the viewers consume the summary in an uncoordinated non-simultaneous manner, then they are not participating in browsing remote control—rather they are just individually consuming the summarization description.) A live browsing remote control session will have a single designated controlling publisher at any point in time. This controller designation may shift from viewer to viewer, similar to passing the TV remote control around while watching TV as a group.

The preferred content requirements for browsing remote control are similar to those for program summary recommendations. The content should be non-linearly navigable with consistent timestamp/offset information, and it should be available to both the publishing and the subscribing viewers. Additionally, the content should be available at the same time (and on the same run).

The hardware (and controlling software) should support the transport control messages. The control should be nearly instantaneous and coordinated with the timestamp or offsets as described previously.

To allow for the non-zero latency of the control messages, there may be a small time shift inserted in the playback of the subscribing viewers. The publisher is watching the program slightly ahead of the subscribers. The shift is made long enough that when the publisher performs a browsing action at a particular point in the program, the control message may be generated, broadcast, received and interpreted prior to the subscribers' devices reaching the same point in the program. Simple or sophisticated techniques can be used to warp the playback rate so that the viewers are watching nearly the same program. Minimizing the time shift (and warping) may be important to keep the playback browsing synchronized with the supplementary conversational communication.

Communication Channels

The system may be extended to support supplementary conversational communication channels. While viewers are sharing content selection and content consumption recommendations, they may also interact in a live conversation session. The conversation sessions may be triggered by system activity, or the sessions may precede the activity.

Figure 17:
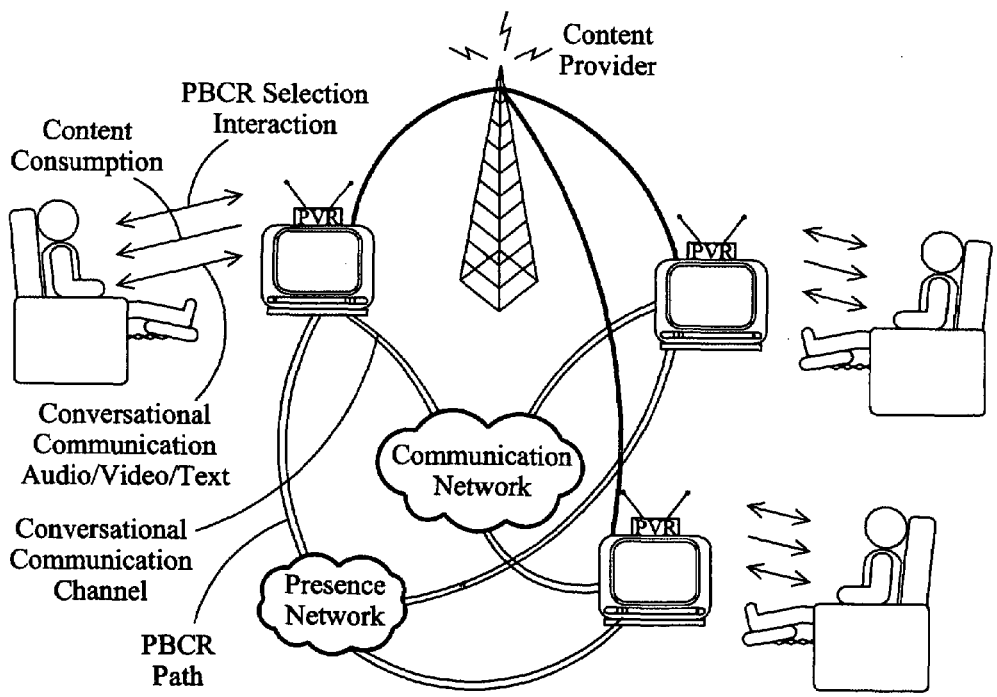
FIG. 17 illustrates a system with conversation communication channels.

The communication channels may match up with the paths of recommendation, or they may exist on a subset or superset of the paths. FIG. 17 depicts the components of a system extended with conversational communication channels. The presence network and the communication network may share network and infrastructure resources, or they may be separate (as shown).

Instant messaging is a primary form of presence technology that is directly usable as a supplementary communication channel. It has a well established set of protocols and implemented applications with rich support for conversational communication sessions. Presence technology may also be used to support new conversation channels that are outside of instant messaging. The Jabber protocol and other protocols which support presence can be used to deliver new structured message formats and new services that can implement the supplementary communication channel extensions from the system. This alternative presence based format may be the preferred way to support custom viewer representations and custom conversational interaction.

Conversational communication sessions can be implemented using other internet based protocols without presence technology. These may include voice over IP, videoconferencing over IP, web data conferencing, place-based collaboration environments (e.g. Microsoft NetMeeting). Conversational communication sessions can be implemented over other carriers such as the content provider channel. Interactive TV (ITV) and Web TV are established protocols that are operational in some market. These infrastructure systems provide 2 way communication within the user community.

When a conversation session is initiated on a supplementary communication channel, the users may be offered various self representation models. This model is a depiction of the viewers, used to uniquely identify them in the conversation. Audio oriented communication channels (e.g. voice over IP, voice conferencing) may rely on the identifiable voice of each member. Alternatively, a set of differentiating tones or beeps could be used to identify each contributor. Text oriented communication channels (e.g. text IM, chat rooms) will probably use the nickname or handle of each member. Video oriented communication channels (e.g. videoconferencing over IP) may use a variety of self representation models, including live video, iconic graphics, picture images, maneuverable images, or some combination of these.

Live video may be supported by standard web cam or PC cameras focused on the participating viewers. Static icons may be selected from a predefined list or users may generate their own. Similarly they may install a static image. Maneuverable images may be supported by MPEG-4 standardized Facial Animation Parameters. Also, static and maneuverable avatars may support a range of expressions and gestures in the conversation. These two maneuverable visual representations may be an attractive feature of the communication channel—simultaneously allowing privacy and flexibility of expression. The self representation models may be mixed and users may dynamically change their model to meet the changing needs of the conversation.

The interaction supported by the conversational communication session should support regular discussion and commentary. In enhanced implementations, the conversation may be integrated into other aspects of the system.

- Systems which support browsing remote control may use the parallel conversation channel to augment the browsing and to implicitly manage the hand-off of browsing control from one viewer to another. Through verbal or visual indications, a request for browsing control can be submitted and then accepted or rejected. (e.g. John says, "let me drive for a bit here Larry".)
- Systems which support place-based collaboration environments (e.g. Microsoft NetMeeting) will use the parallel conversation channel to augment the collaboration environment. (In fact, the parallel conversation channel is an integral part of these systems.) Through on screen pointers, a viewer can emphasize or sketch notes on the concurrently viewed program.
- Systems which support live interactive collaborative selection will use the parallel conversation channel to support and coordinate the selection process. In this scheme, a selection menu (e.g. EPG guide or keyword search) is synchronously presented on all the participating members' devices. Through the conversation channel, the users may describe what they are doing as any of them controls or modifies the selection interface.

Supplementary Recommendations

The pure recommendations generated by the device may be augmented with other related recommendations to enhance the system functionality.

The recommendations generated by linking to anonymous cross-group viewer sets are a type of related recommendation that may be provided as a supplement to the regular in-group sources. These cross-group items and all the related recommendations described in this section may be presented to the viewer in a side panel or "additional" navigation button on any of the user interfaces that show the recommendation listings. For instance, the "Friends Recommend" user interface may have the pure listing on the left side of the screen, and a separate listing on the right containing the related recommendations.

The recommendations that are passed through the localization processor are known to be available to the viewer. The related recommendations list may be implemented so that program selections that are not immediately available, but may be available in VOD or other pay-per-use methods, are presented in the related recommendations list. This list of VOD-available selections would preferably be generated by the regular publishing viewer set. Additionally, it would contain cross-group recommendations and the wholly-commercial collaborative results of recommendation engines.

The list of presently unavailable programs that is presented in the related recommendations user interface may be a service to help the viewer consume the content they desire, or it may be a means to pull the viewer into new revenue-paying content that they might not have viewed otherwise. An extension of the straight content delivery options is the provision for alternate content versions. For instance, the content delivery options under the related recommendations list may contain director's cut versions or high definition versions of the same program.

Related recommendations may include links and summaries that enhance the content consumption experience. These may be offered as options to the regular content playback. The interactive capability that is integrated in the various recommendation listings may offer selectable options that enable one or more of the following.

- Program summarization description—e.g. a professionally generated summary for a sports event
- Program commentary, summary notes, background material
- Related links, broadcaster web pages, program web pages—e.g. provided through a TV or compliant format.

IP Television

Other configurations may include a video display device, such as an IP based television, that permits the bidirectional data communications. In this configuration, the local storage of video content would be replaced or otherwise supplemented by a network storage device. In some cases, the display device may be in the form of a game console.

The invention claimed is:

1. A system comprising:
   (a) a first audiovisual device capable of receiving audiovisual content;
   (b) a second and third audiovisual device capable of providing data descriptive of said audiovisual content;
   (c) said first audiovisual device obtaining recommendations for audiovisual content by said second and third audiovisual devices, which each categorize said recommendations under a hierarchial relevance scheme;
   (d) said first, second, and third audiovisual devices joined in a first group;
   (e) a fourth and fifth audiovisual device capable of providing data descriptive of said audiovisual content;
   (f) said first audiovisual device obtaining reccomendations for audiovisual content by said fourth and fifth audiovisual devices, which each categorize said recommendations under said hierarchial relevance scheme;
   (g) said first, fourth and fifth audiovisual devices joined in a second group;
   (h) wherein said first audiovisual device filters recommendations using said relevance scheme, and wherein recommendations provided by said first group are filtered by said first audiovisual device in a different manner than are recommendations provided by said second group.

2. The system of claim 1 wherein said filtering is based upon different privacy characteristics.

3. The system of claim 1 wherein said filtering is based upon feedback from said first audiovisual device.

4. The system of claim 1 wherein said first audiovisual device is capable of providing a recommendation for audiovisual content to a third group to which said first audiovisual device is free from being joined.

* * * * *